(12) United States Patent
Touma et al.

(10) Patent No.: US 6,288,806 B1
(45) Date of Patent: Sep. 11, 2001

(54) OPTICAL SUBSCRIBER NETWORK SYSTEM AND FAULT SUPERVISING METHOD FOR OPTICAL SUBSCRIBER NETWORK SYSTEM

(75) Inventors: Eisaku Touma; Takashi Sakata, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/046,528

(22) Filed: Mar. 24, 1998

(30) Foreign Application Priority Data

Oct. 8, 1997 (JP) .................................................. 9-276289

(51) Int. Cl.⁷ .................................................. H04J 14/02
(52) U.S. Cl. .......................................... 359/110; 359/125
(58) Field of Search .................................. 359/110, 161, 359/137, 125, 126, 177

(56) References Cited

U.S. PATENT DOCUMENTS

| | | | | |
|---|---|---|---|---|
| 5,500,753 | * | 3/1996 | Sutherland | 359/125 |
| 5,523,868 | * | 6/1996 | Hawley | 359/110 |
| 5,731,887 | * | 3/1998 | Fee | 359/110 |
| 5,880,865 | * | 3/1999 | Lu et al. | 359/125 |
| 6,055,694 | * | 12/1999 | Liu | 359/110 |
| 6,061,328 | * | 5/2000 | Read et al. | 370/216 |
| 6,094,442 | * | 7/2000 | Okamoto et al. | 370/506 |
| 6,108,113 | * | 8/2000 | Fee | 359/124 |

FOREIGN PATENT DOCUMENTS

| | | |
|---|---|---|
| 0546707 | 6/1993 | (EP) . |
| 0693831 | 1/1996 | (EP) . |
| 93/13617 | 7/1993 | (WO) . |

* cited by examiner

*Primary Examiner*—Jason Chan
*Assistant Examiner*—Dalzid Singh
(74) *Attorney, Agent, or Firm*—Helfgott & Karas, PC

(57) ABSTRACT

The invention provides an optical subscriber network system which can secure dual construction of optical transmission/reception sections of optical network units, specification of a failed faulty point in optical transmission lines and reception circuits of the optical network units and regular timing transmission of upstream data. The optical subscriber network system has a passive optical network construction wherein a plurality of network units are accommodated in a station apparatus through an optical transmission line using a passive optical element, and includes bypass transmission lines for mutual supervision control between the network units. A network unit mutual supervision control signal is communicated between the network units through the bypass transmission lines. The network unit mutual supervision control information received by each of the network units is transmitted to the station apparatus through the optical transmission line so that a fault is supervised based on the network unit mutual supervision control information by the station apparatus.

23 Claims, 16 Drawing Sheets

OPTICAL SUBSCRIBER NETWORK SYSTEM AND FAULT SUPERVISING METHOD FOR OPTICAL SUBSCRIBER NETWORK SYSTEM

BACKGROUND OF THE INVENTION

1. Field of the Invention

This invention relates to an optical subscriber network system suitable for use with a passive optical network system and a fault supervising method for an optical subscriber network system.

2. Description of the Related Art

FIG. 12 schematically shows a construction of an ordinary station subscriber network. In the construction of the ordinary station subscriber network shown in FIG. 12, for optincal network units (ONU) 1' to N' (N' is a natural number) which require high speed communication of a large capacity, optical fibers are usually laid in a one by one corresponding relationship from a station apparatus 100' to accommodate the optincal network units (ONU) 1' to N' in the station.

In recent years, as a system which economically accommodates subscribers who require broad-band communication, such a passive optical network (PON) system as shown in FIG. 13 has been proposed taking the economy and so forth into consideration.

In the passive optical network (PON) system shown in FIG. 13, an optical distributor-coupler (star coupler) 50' formed from a passive element is interposed between a station apparatus 100" and optical network units (ONU) 1" to N" (N" is a natural number), and one pair of optical fibers or, for the object of redundancy, two pairs of optical fibers, are laid between the station apparatus 100' and the optical distributor-coupler 50'. The optical distributor-coupler 50' distributes downstream optical signals from the station apparatus 100' to the optical network units (ONU) 1" to N". On the other hand, optical signals from the optical network units (ONU) 1" to N" are transmitted in upstream frames only for times of time slots allocated thereto and then coupled by the optical distributor-coupler 50', whereafter they are transmitted to the station apparatus 100".

Here, for upstream communication from the optical network units (ONU) 1" to N" to the station apparatus 100", TDMA (Time Division Multiple Access) is used, and for downstream communication, TCM (Time Compression Multiplexing) which is a combination of TDM (Time Division Multiplexing) is used.

A construction of a frame of the TDM/TDMA described above is illustrated in FIG. 14.

Accordingly, with the passive optical network (PON) system, since the optical transmission lines and the subscriber optical transmission lines of the station apparatus 100" are used commonly, the cost required for construction of the system can be reduced comparing with the station subscriber network construction shown in FIG. 12 wherein the station apparatus 100' and the optincal network units (ONU) 1' to N' are connected in a one by one corresponding relationship to each other.

Further, since a passive element is used as an optical distributor-coupler, improvement in reliability of the system can be anticipated comparing with another system wherein optical signals are multiplexed and demultiplexed using an active apparatus.

However, with the construction of the passive optical network (PON) shown in FIG. 13, while dual construction of the transmission line from the station apparatus 100" to the optical distributor-coupler 50' can be achieved readily, if it is tried to construct the transmission lines on the subscribers side with respect to the optical distributor-coupler 50' in dual construction, then optical transmission/reception sections of the optical network units (ONU) 1" to N" must all be constructed in dual construction, and a significant increase in cost cannot be avoided.

Further, if a fault such as a physical damage to an optical transmission line or a failure of an optical reception circuit of an optical network unit (ONU) occurs, then since an upstream optical signal must be transmitted based on a timing of a downstream signal, resultantly an upstream signal cannot be transmitted irrespective of the point of the fault, and there is no available method of discriminating the point of the fault from the station side.

Further, since a small number of optical transmission lines are used commonly by the plurality of optical network units (ONU) 1" to N", if a certain optical network unit (ONU) transmits upstream data at an irregular timing to the station apparatus 100" because of a fault of the certain optical network unit (ONU), then it may possibly interfere with communication between station subscribers of those optical network units (ONU) which are operating regularly.

FIG. 15 illustrates an example of communication interference between station subscribers of the optical network unit (ONU) 1" which is operating regularly. As seen from FIG. 15, since, in the passive optical network (PON) system, a small number of optical transmission lines are used commonly by the plurality of optical network units (ONU) 1" to N", if upstream data to the station apparatus 100" is transmitted at an irregular timing, then there is the possibility that a problem that the upstream data interferes with communication between station subscribers which are operating regularly may occur.

In other words, if, for example, the optical network unit (ONU) 2" transmits an upstream frame at a timing different from the timing at which it should originally be transmitted, then it may interfere with communication of the optical network unit (ONU) 1".

FIG. 16 illustrates an influence of a fault of an optical network unit when the optical network unit transmits an irregular upstream frame. Referring to FIG. 16, by an influence of an upstream frame transmitted from the optical network unit (ONU) 2" with which a fault has occurred, an upstream frame transmitted from the optical network unit (ONU) 1" suffers from frame collision, resulting in failure in communication.

Accordingly, there is a subject to be solved in that it is desirable to secure dual construction of optical transmission/reception sections and so forth of optical network units, specification of a failure fault point in optical transmission lines and optical network units and regular timing transmission of upstream data.

SUMMARY OF THE INVENTION

It is an object of the present invention to provide an optical subscriber network (PON) system which secures dual construction of optical transmission/reception sections and so forth of optical network units, specification of a failure fault point in optical transmission lines and optical network units and regular timing transmission of upstream data and a fault supervising method for an optical subscriber network system.

In order to attain the object described above, according to an aspect of the present invention, there is provided an optical subscriber network system of a passive optical network construction wherein a plurality of network units are accommodated in a station apparatus through an optical transmission line using a passive optical element, comprising bypass transmission lines for mutual supervision control between the network units, each of the network units including transmission/reception means for transmitting and receiving a network unit mutual supervision control signal to and from another one of the network units through an available one of the bypass transmission lines, and means for transmitting received network unit mutual supervision control information to the station apparatus through the optical transmission line, the station apparatus including means for supervising a fault from the network unit mutual supervision control information.

With the optical subscriber network system, it is possible to transmit information regarding each of the network units (unit information and so forth; a reception condition of an optical signal from the station apparatus, an optical signal transmission condition and so forth) to the station apparatus through the optical transmission line, stop operation of a network unit, which is operating irregularly, by control of the station apparatus, suppress interference of a fault of a certain network unit with communication of another network unit with the station apparatus and reduce occurrences of congestion in the optical subscriber network. Further, since another network unit which is different from a faulty network unit and is operating regularly interrupts communication from the faulty network unit using an available one of the bypass transmission lines and transmits such information as described above to the station apparatus, the optical subscriber network system is further advantageous in that pseudo dual construction of the transmission line between the station and each of the subscriber units can be achieved, and consequently, communication between the faulty network unit and the station apparatus can be secured.

According to another aspect of the present invention, there is provided an optical subscriber network system of a passive optical network construction wherein a plurality of network units are accommodated in a station apparatus through an optical transmission line using a passive optical element, comprising bypass transmission lines for mutual supervision control are provided between the network units, a faulty network unit which is any one of the network units which is not capable of communicating with the station apparatus through the optical transmission line including transmission means for transmitting a network unit mutual supervision control signal to one of non-faulty ones of the network units other than the faulty network unit through an available one of the bypass transmission lines, the non-faulty network unit including means for transmitting the network unit mutual supervision control information received from the faulty network unit to the station apparatus through the optical transmission line connected to the non-faulty network unit, the station apparatus including means for supervising a fault from the network unit mutual supervision control information.

With the optical subscriber network system, it is possible to transmit information regarding each of the network units (unit information and so forth; a reception condition of an optical signal from the station apparatus, an optical signal transmission condition and so forth) to the station apparatus through the optical transmission line and specify a faulty network unit. The optical subscriber network system is further advantageous in that communication from the faulty network unit to the station apparatus can be secured and pseudo dual construction of the transmission line between the station and each of the subscriber units can be achieved.

Each of the optical subscriber network systems described above may be constructed such that each of the bypass transmission lines connects adjacent ones of the network units.

In this instance, since each of the bypass transmission lines connects adjacent ones of the network units, the optical subscriber network system is advantageous in that a unit state of an adjacent network unit can be reported to the station apparatus and also in that control information of a network unit, which has a fault, from the station apparatus can be received by an adjacent network unit and transmitted to the faulty network unit by an available one of the bypass transmission lines to control the faulty network unit.

The first optical subscriber network system described above may be constructed such that a faulty network unit which is any one of the network units which is not capable of communicating with the station apparatus through the optical transmission line includes transmission means for transmitting a network unit mutual supervision control signal to one of non-faulty ones of the network units other than the faulty network unit through an available one of the bypass transmission lines, and the non-faulty network unit includes means for transmitting the network unit mutual supervision control information received from the faulty network unit to the station apparatus through the optical transmission line connected to the non-faulty network unit.

With the optical subscriber network system, it is possible to transmit information regarding each of the network units (unit information and so forth; a reception condition of an optical signal from the station apparatus, an optical signal transmission condition and so forth) to the station apparatus through the optical transmission line. Further, since another network unit which is different from a faulty network unit and is operating regularly interrupts communication from the faulty network unit using an available one of the bypass transmission lines and transmits such information as described above to the station apparatus, the optical subscriber network system is further advantageous in that pseudo dual construction of the transmission line between the station and each of the subscriber units can be achieved, and consequently, communication between the faulty network unit and the station apparatus can be secured.

Each of the optical subscriber network systems described above may be constructed such that the non-faulty subscriber unit includes means for transmitting network unit mutual supervision control information received from the station apparatus to the faulty network unit through the available bypass transmission line, and the faulty subscriber unit includes means for receiving the network unit mutual supervision control information from the non-faulty network unit.

With the optical subscriber network system, since information regarding each of the network units (unit information and so forth; a reception condition of an optical signal from the station apparatus, an optical signal transmission condition and so forth) can be transmitted to the station apparatus through the optical transmission line and a subscriber unit which is different from a faulty network unit and is operating regularly can repeat communication from the station apparatus using an available one of the bypass transmission lines, a control signal from the station apparatus to the faulty network unit can be repeated. Consequently, the optical subscriber network system is further advantageous in that communication between the faulty network unit and the station apparatus can be secured and pseudo dual construction of the transmission line between the station and each of the subscriber units can be achieved.

Each of the optical subscriber network systems described above may be constructed such that a faulty network unit which is any one of the network units which is not capable of communicating with the station apparatus through the optical transmission line includes transmission means for transmitting communication data to the non-faulty network unit through the available bypass transmission line, and the non-faulty network unit includes means for transmitting the communication data received from the faulty network unit to the station apparatus through the optical transmission line connected to the non-faulty network unit.

With the optical subscriber network system, since information regarding each of the network units (unit information and so forth; a reception condition of an optical signal from the station apparatus, an optical signal transmission condition and so forth) can be transmitted to the station apparatus through the optical transmission line and a subscriber unit which is different from a faulty network unit and is operating regularly can interrupt communication from the faulty network unit and transmit such information as described above to the station apparatus using an available one of the bypass transmission lines, the optical subscriber network system is advantageous in that pseudo dual construction of the transmission line between the station and each of the subscriber units can be achieved and communication between the faulty network unit and the station apparatus can be secured.

Further, each of the optical subscriber network systems described above may be constructed such that the non-faulty network unit other than the faulty network unit which is any one of the network units which is not capable of communicating with the station apparatus through the optical transmission line includes means for transmitting communication data received from the station apparatus to the faulty network unit through the available bypass transmission line, and the faulty network unit includes means for receiving the communication data from the non-faulty network unit.

With the optical subscriber network system, since information regarding each of the network units (unit information and so forth; a reception condition of an optical signal from the station apparatus, an optical signal transmission condition and so forth) can be transmitted to the station apparatus through the optical transmission line and a subscriber unit which is different from a faulty network unit and is operating regularly can transmit communication repeated from the station apparatus to the faulty network unit using an available one of the bypass transmission lines, the optical subscriber network system is advantageous in that pseudo dual construction of the transmission line between the station and each of the subscriber units can be achieved and communication between the faulty network unit and the station apparatus can be secured.

According to a further aspect of the present invention, there is provided a fault supervising method for an optical subscriber network system of a passive optical network construction wherein a plurality of network units are accommodated in a station apparatus through an optical transmission line using a passive optical element, comprising the steps of providing bypass transmission lines for mutual supervision control between the network units, communicating a network unit mutual supervision control signal between the network units through the bypass transmission lines, and transmitting the network unit mutual supervision control information received by each of the network units to the station apparatus through the optical transmission line so that a fault is supervised based on the network unit mutual supervision control information by the station apparatus.

With the fault supervising method for an optical subscriber network system, it is possible to transmit information regarding each of the network units (unit information and so forth; a reception condition of an optical signal from the station apparatus, an optical signal transmission condition and so forth) to the station apparatus through the optical transmission line, stop operation of a network unit, which is operating irregularly, by control of the station apparatus, suppress interference of a fault of a certain network unit with communication of another network unit with the station apparatus and reduce occurrences of congestion in the optical subscriber network. Further, since another network unit which is different from a faulty network unit and is operating regularly interrupts communication from the faulty network unit using an available one of the bypass transmission lines and transmits such information as described above to the station apparatus, the fault supervising method for an optical subscriber network system is further advantageous in that pseudo dual construction of the transmission line between the station and each of the subscriber units can be achieved, and consequently, communication between the faulty network unit and the station apparatus can be secured.

The fault supervising method for an optical subscriber network system is constructed such that network unit mutual supervision control information to be transmitted from each of the network units to the station apparatus through the optical transmission line is inserted into part of a communication data transmission frame so as to be transmitted as multi-frame information to the station apparatus.

With the fault supervising method for an optical subscriber network system, it is possible to transmit information regarding each of the network units (unit information and so forth; a reception condition of an optical signal from the station apparatus, an optical signal transmission condition and so forth) to the station apparatus through the optical transmission line, stop operation of a network unit, which is operating irregularly, by control of the station apparatus, suppress interference of a fault of a certain network unit with communication of another network unit with the station apparatus and reduce occurrences of congestion in the optical subscriber network. Further, since another network unit which is different from a faulty network unit and is operating regularly interrupts communication from the faulty network unit using an available one of the bypass transmission lines and transmits such information as described above to the station apparatus, the fault supervising method for an optical subscriber network system is further advantageous in that pseudo dual construction of the transmission line between the station and each of the subscriber units can be achieved, and consequently, communication between the faulty network unit and the station apparatus can be secured.

The fault supervising method for an optical subscriber network system may be constructed such that, when an optical transmission line between a particular one of the network units and the station apparatus has a fault, the network unit mutual supervision control signal from the particular network unit is received by one of non-faulty ones of the network units which is adjacent the particular network unit through an available one of the bypass transmission lines, and the received network unit mutual supervision control information is transmitted to the station apparatus through the optical transmission line so that the fault of the particular network unit is supervised by the station apparatus.

The fault supervising method for an optical subscriber network system is further advantageous in that information regarding each of the network units (unit information and so forth; a reception condition of an optical signal from the station apparatus, an optical signal transmission condition and so forth) can be transmitted to the station apparatus through the optical transmission line and the station apparatus can specify a network unit which has a fault.

The fault supervising method for an optical subscriber network system may be constructed such that, when a particular one of the network units has a fault, the network unit mutual supervision control signal from the particular network unit is received by one of non-faulty ones of the network units which is adjacent the particular network unit through an available one of the bypass transmission lines, and the received network unit mutual supervision control information is transmitted to the station apparatus through the optical transmission line so that the fault of the particular network unit is supervised by the station apparatus.

The fault supervising method for an optical subscriber network system is further advantageous in that information regarding each of the network units (unit information and so forth; a reception condition of an optical signal from the station apparatus, an optical signal transmission condition and so forth) can be transmitted to the station apparatus through the optical transmission line and the station apparatus can specify a network unit which has a fault.

The fault supervising method for an optical subscriber network system may be constructed such that, if a particular one of the network units transmits an irregular signal toward the station apparatus through the optical transmission line and communication with the particular network unit and a different one of the network units from the particular network unit is disabled by the irregular signal, the station apparatus successively transmits a network unit stopping signal to the particular network unit and the different network unit via those of the network units with which communication remains enabled and available ones of the bypass transmission lines to successively stop the particular network unit and the different network unit to specify the particular network unit which transmits the irregular signal.

The fault supervising method for an optical subscriber network system is advantageous in that it is possible to stop operation of a network unit, which is operating irregularly, by control of the station apparatus, suppress interference of a fault of a certain network unit with communication of another network unit with the station apparatus and reduce occurrences of congestion in the optical subscriber network.

The fault supervising method for an optical subscriber network system may be constructed such that, when an optical transmission line between a particular one of the network units and the station apparatus has a fault, communication data from the particular network unit is transmitted to the station apparatus through an available one of the bypass transmission lines, one of non-faulty ones of the network units other than the particular network unit and the optical transmission line between the non-faulty network unit and the station apparatus.

The fault supervising method for an optical subscriber network system is advantageous in that communication from the faulty network unit to the station apparatus can be secured and pseudo dual construction of the transmission line between the station and each of the subscriber units can be achieved.

The fault supervising method for an optical subscriber network system may be constructed such that, when an optical transmission line between a particular one of the network units and the station apparatus has a fault, communication data from the station apparatus is transmitted to the particular network unit through one of non-faulty ones of the network units other than the particular network unit and an available one of the bypass transmission lines.

The fault supervising method for an optical subscriber network system is advantageous in that communication from the station apparatus to the faulty network unit can be secured and pseudo dual construction of the transmission line between the station and each of the subscriber units can be achieved.

The fault supervising method for an optical subscriber network system may be constructed such that, when a particular one of the network units has a fault, communication data from the particular network unit is transmitted to the station apparatus through an available one of the bypass transmission lines, one of non-faulty ones of the network units other than the particular network unit and the optical transmission line between the non-faulty network unit and the station apparatus.

The fault supervising method for an optical subscriber network system is advantageous in that communication from the faulty network unit to the station apparatus can be secured and pseudo dual construction of the transmission line between the station and each of the subscriber units can be achieved.

The fault supervising method for an optical subscriber network system may be constructed such that, when a particular one of the network units has a fault, communication data from the station apparatus is transmitted to the particular network unit through one of non-faulty ones of the network units other than the particular network unit and an available one of the bypass transmission lines.

The fault supervising method for an optical subscriber network system is advantageous in that communication from the station apparatus to the faulty network unit can be secured and pseudo dual construction of the transmission line between the station and each of the subscriber units can be achieved.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENT

1) Embodiment

In the following, an optical subscriber network system 200 as a preferred embodiment of the present invention is described with reference to the accompanying drawings.

Figure 1:
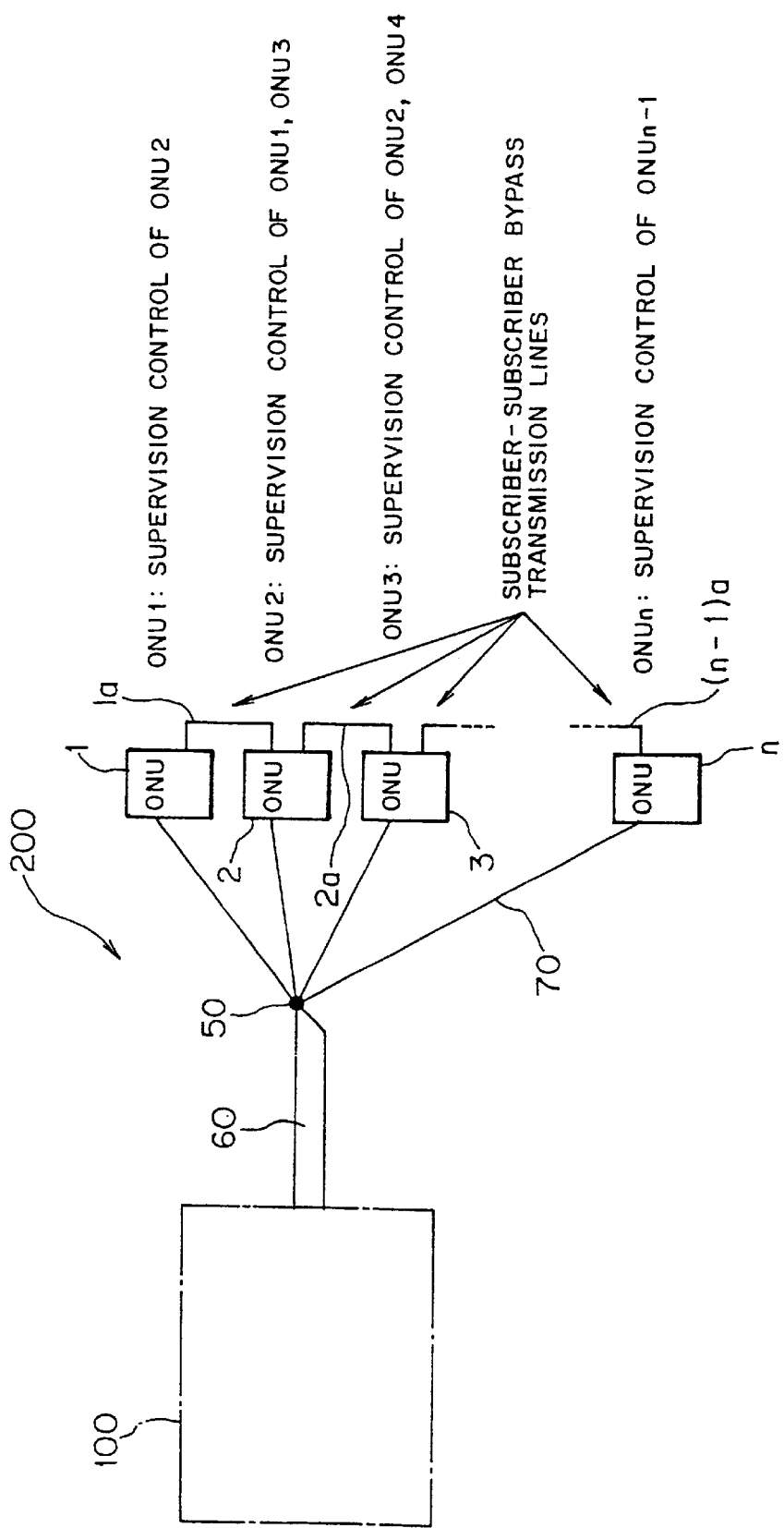
FIG. 1 is a diagrammatic view schematically showing a construction of a network of an optical subscriber network system according to a preferred embodiment of the present invention.

FIG. 1 schematically shows a construction of the optical subscriber network system 200 according to the preferred embodiment of the present invention. Referring to FIG. 1, the optical subscriber network system (PON) 200 shown includes n optical network units (ONU) 1 to n connected to an optical coupler 50 in the form of a star coupler as a passive optical element individually by transmission lines 70. A transmission line 60 in the form of an optical fiber which is used commonly by the optical network units (ONU) 1 to n is laid between the star coupler 50 and a station apparatus 100 to connect them to each other. Consequently, optical signals can be transmitted from the optical network units (ONU) 1 to n to the station apparatus 100 or vice versa. Meanwhile, adjacent ones of the optical network units (ONU) 1 to n are connected to each other by subscriber-subscriber bypass transmission lines 1a to (n-1)a so that information regarding the optical network units (ONU) 1 to n may be communicated between them.

It is to be noted that each of the subscriber-subscriber bypass transmission lines 1a to (n-1)a is formed as an electric transmission line or a radio channel and is used for communication of control information of the optical network units such as mutual supervision control information and also for communication of a main signal and so forth from the station apparatus 100.

The optical fiber 60 extending from the station apparatus 100 to the optical coupler 50 actually includes one pair or two pairs of optical fibers while each of the transmission lines 70 from the optical coupler 50 to the optical network units (ONU) 1 to n actually includes a pair of cables.

Figure 2:
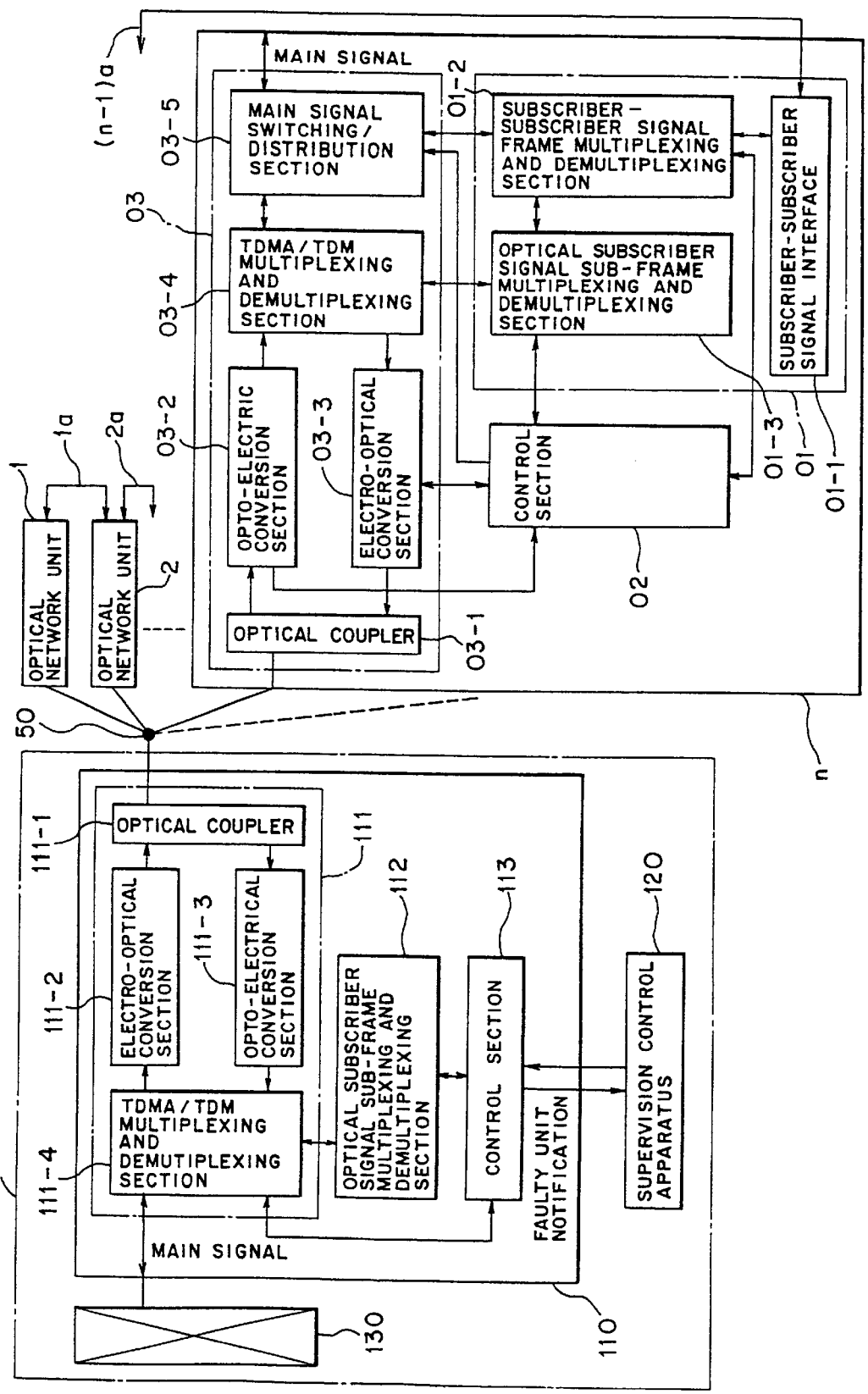
FIG. 2 is a block diagram showing essential part of the optical subscriber network system of FIG. 1.

FIG. 2 shows a construction of essential part of the optical network units (ONU) 1 to n and the station apparatus 100 of the optical subscriber network system 200 according to the embodiment of the present invention. Referring to FIG. 2. each of the optical network units (ONU) 1 to n includes a subscriber-subscriber interface section 01, a control section 02 and a main signal system section 03. Meanwhile, the station apparatus 100 includes a station optical subscriber terminating set 110, a supervision control apparatus 120 and an exchange 130.

Each of the subscriber-subscriber interface sections 01 transmits and receives information to and from the subscriber-subscriber interface section 01 of adjacent ones of the optical network units (ONU) 1 to n through available ones of the subscriber-subscriber bypass transmission lines 1a to (n-1)a, and includes a subscriber-subscriber signal interface 01-1, a subscriber-subscriber signal frame multiplexing and demultiplexing section 01-2 and an optical subscriber signal sub-frame multiplexing and demultiplexing section 01-3.

The subscriber-subscriber signal interface 01-1 performs interfacing with different ones of the optical network units (ONU) 1 to n and has functions of adjustment of a transfer rate or a timing of a signal to be transmitted between two optical network units, conversion of an electric level and so forth.

The subscriber-subscriber signal frame multiplexing and demultiplexing section 01-2 demultiplexes and multiplexes supervision control data and so forth destined for another optical network unit from and into a subscriber-subscriber signal frame 20 (which is hereinafter described) to be transmitted through a subscriber-to-subscriber bypass transmission line or demultiplexes and multiplexes, when a fault occurs with a network unit, a main signal (communication data) in order to effect bypass transmission of the communication data.

The optical subscriber signal sub-frame multiplexing and demultiplexing section 01-3 multiplexes or demultiplexes supervision control data from another optical network unit into or from a station-subscriber optical signal frame.

The control section 02 has a function of supervising a state of the self apparatus, for example, a state of optical transmission/reception circuits in the insider of the network unit. Further, as control of the optical network unit, for example, when a main signal to a different optical network unit is received, the control section 02 controls switching of the main signal of the main signal system section 03 so that the main signal may be sent to the different optical network unit through a subscriber-to-subscriber bypass transmission line.

The main signal system section 03 is provided to principally transmit and receive a main signal to and from the station apparatus 100. As seen from FIG. 2, the main signal system section 03 includes an optical coupler 03-1, an opto-electric conversion section (O/E) 03-2, an electro-optical conversion section (E/O) 03-3, a TDMA/TDM multiplexing and demultiplexing section 03-4 and a main signal switching/distribution section 03-5.

Figure 3:
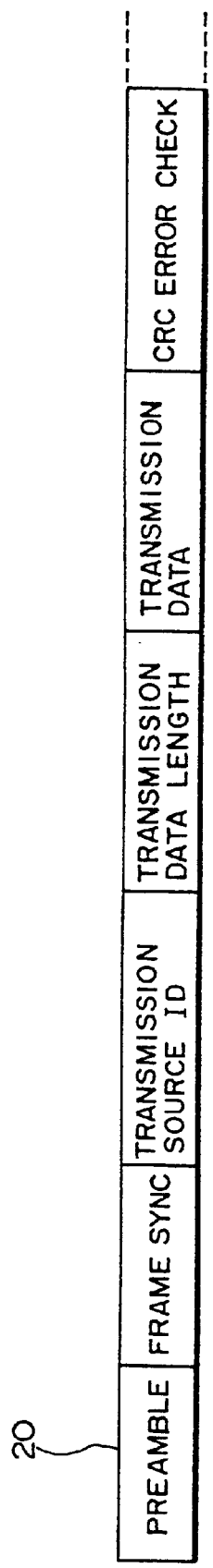
FIG. 3 is a diagram illustrating a subscriber-subscriber signal frame used in the optical subscriber network system of FIG. 1.

By the way, the optical network units (ONU) 1 to n transmit information of states of them as network unit mutual supervision controlling signals to adjacent ones of the optical network units (ONU) 1 to n through the subscriber-subscriber bypass transmission lines 1a to (n-1)a, and for communication of such network unit mutual supervision controlling signals, a subscriber-subscriber signal frame 20 illustrated in FIG. 3 is used.

The subscriber-subscriber signal frame 20 illustrated in FIG. 3 is used for transmission of a network unit mutual supervision controlling signal between the optical network units (ONU) 1 to n. As seen from FIG. 3, to the subscriber-subscriber signal frame 20, fields for accommodating information such as a preamble, frame synchronous information, an ID allocated individually to an apparatus of a source of transmission, a transmission data length, transmission data [apparatus operation situation (apparatus state and so forth) data] and CRCs for transmission error detection are allocated.

Thus, information regarding an optical network unit such as an optical signal reception condition from the station apparatus 100, a state of the transmission/reception circuits based on a self diagnosis in the inside of the apparatus and so forth are produced as transmission data in the subscriber-subscriber signal frame 20. The subscriber-subscriber signal frame 20 is transmitted to and received by another optical network apparatus through an available one of the subscriber-subscriber bypass transmission lines 1a to (n-1)a.

Meanwhile, between each of the optical network units (ONU) 1 to n and the station apparatus 100, not only a main signal but also information of an adjacent optical network unit as network unit mutual supervision control information is communicated. It is to be noted that, for communication of a signal between each of the optical network units (ONU) 1 to n and the station apparatus 100, an upstream frame 30 and a downstream frame 40 illustrated in FIGS. 4 and 5, respectively, are used. The upstream frame 30 illustrated in FIG. 4 includes a preamble part (Preamble), frame synchronism information (Frame sync), an optical network unit ID (ONU ID), main signal system data, CRC error check information (CRC Error Check) and so forth.

Figure 4:
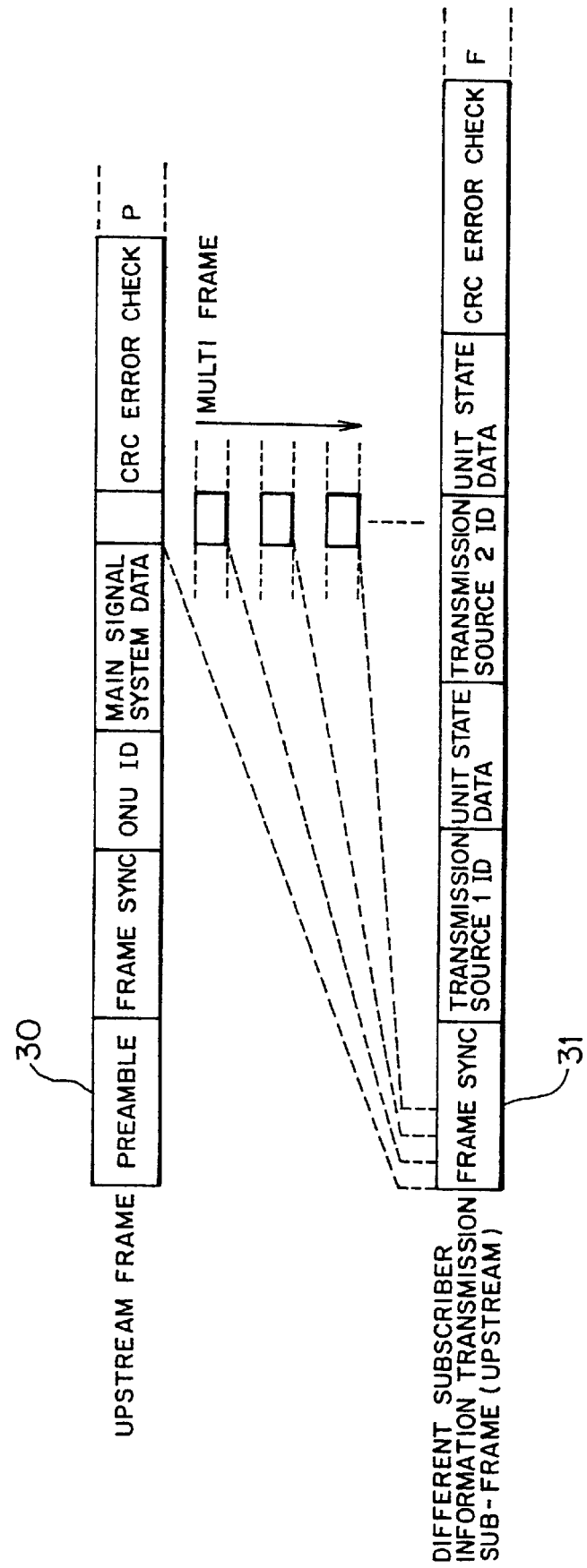
FIG. 4 is a diagrammatic view illustrating an upstream frame from a subscriber which is one of station-subscriber optical signal frames used in the optical subscriber network system of FIG. 1.

Here, a different subscriber information transmission sub-frame (upstream) 31 illustrated in FIG. 4 is used to transmit information of an adjacent optical network unit to the station apparatus 100. The different subscriber information transmission sub-frame 31 is divisionally inserted into part of main signal system data of upstream frames 30 and transmitted to the station apparatus 100.

Figure 5:
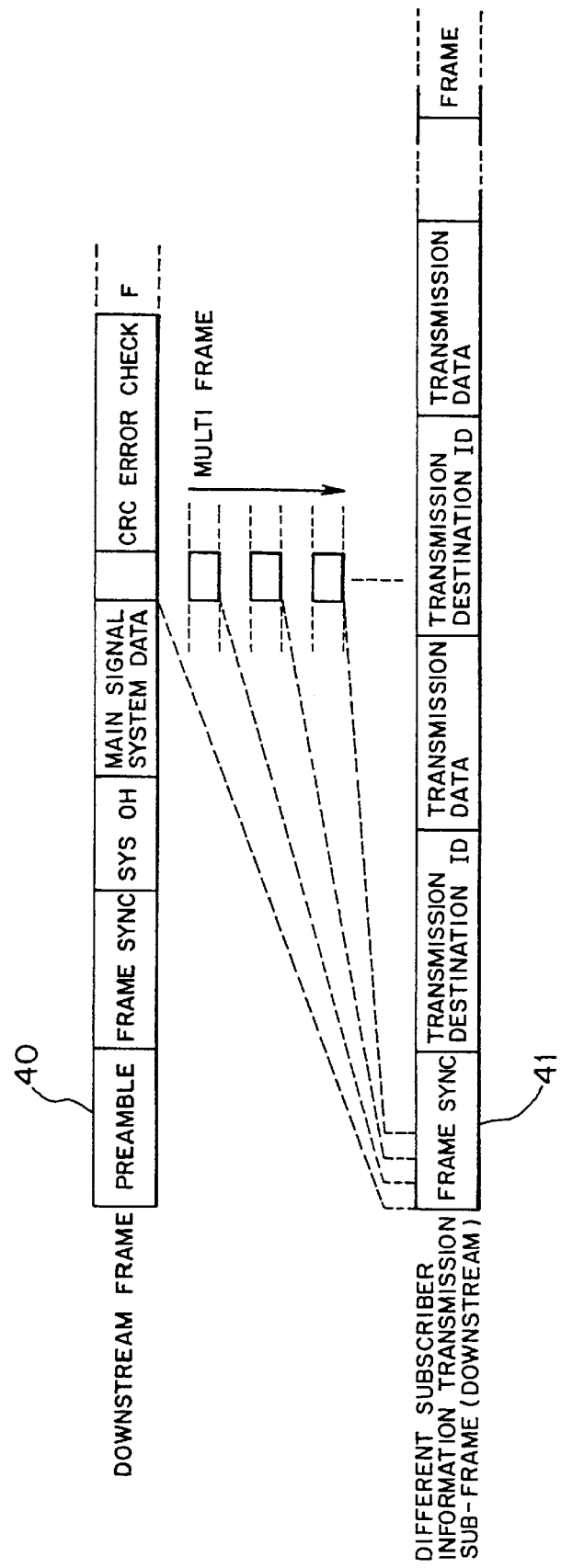
FIG. 5 is a similar view but illustrating a downstream frame from a station apparatus which is another one of the station-subscriber optical signal frames used in the optical subscriber network system of FIG. 1.

On the other hand, the downstream frame 40 includes, as seen in FIG. 5, a preamble part (Preamble), frame synchronism information (Frame sync), SYS OH, main signal system data, CRC error check information (CRC Error Check) and so forth.

Here, a different subscriber information transmission sub-frame (downstream) 41 illustrated in FIG. 5 is used to transmit control information as network unit mutual supervision control information from the station apparatus 100 to each of the optical network units (ONU) 1 to n, and is divisionally inserted into part of main signal system data of downstream frames 40 and transmitted to the optical network units (ONU) 1 to n.

Referring back to FIG. 2, the station optical subscriber terminating set 110 in the station apparatus 100 includes a main signal system section 111, an optical subscriber signal sub-frame multiplexing and demultiplexing section 112 and a control section 113.

The main signal system section 111 includes an optical coupler 111-1, an electro-optical conversion section 111-2, an opto-electrical conversion section 111-3 and a TDMA/TDM multiplexing and demultiplexing section 111-4, and principally transmits and receives an optical signal to and from the optical network units (ONU) 1 to n and performs opto-electric conversion, multiplexing or demultiplexing processing and so forth. The optical subscriber signal sub-frame multiplexing and demultiplexing section 112 produces, under the control of the control section 113, different subscriber information transmission sub-frames (downstream) to be transmitted to the optical network units (ONU) 1 to n and performs multiplexing and demultiplexing processing of different subscriber information transmission sub-frames (upstream (31) or downstream (41)) from part of main signal system data of a station-subscriber upstream or downstream frame (30 or 40).

In other words, when data such as control information is to be transmitted as subscriber-subscriber control supervision information between the station apparatus 100 and the optical network units (ONU) 1 to n, different subscriber information transmission sub-frames 41 illustrated in FIG. 5 and including the control information data and so forth are multiplexed into and transmitted together with part of the main signal system data of downstream frames 40.

The optical subscriber signal sub-frame multiplexing and demultiplexing section 112 transmits data of an apparatus state of an optical network unit (ONU) and so forth included in each different subscriber information transmission sub-frame (upstream) 31 transmitted as a multi-frame to the control section 113.

The control section 113 detects an irregular upstream signal and selectively outputs a network unit stopping signal. The control section 113 further controls the optical subscriber signal sub-frame multiplexing and demultiplexing section 112 and the TDMA/TDM multiplexing and demultiplexing section 111-4 of the main signal system section 111. Furthermore, the control section 113 notifies the supervision control apparatus 120 of detection information and so forth and operates in response an instruction from the supervision control apparatus 120.

The supervision control apparatus 120 supervises and controls apparatus states of the optical network units (ONU) 1 to n and controls the control section 113 when an optical network unit stopping signal is to be transmitted or the like.

In the following, a construction of the optical network units in the optical subscriber network system 200 of the embodiment of the present invention is described for different states of an optical network unit with reference to FIG. 6.

Figure 6:
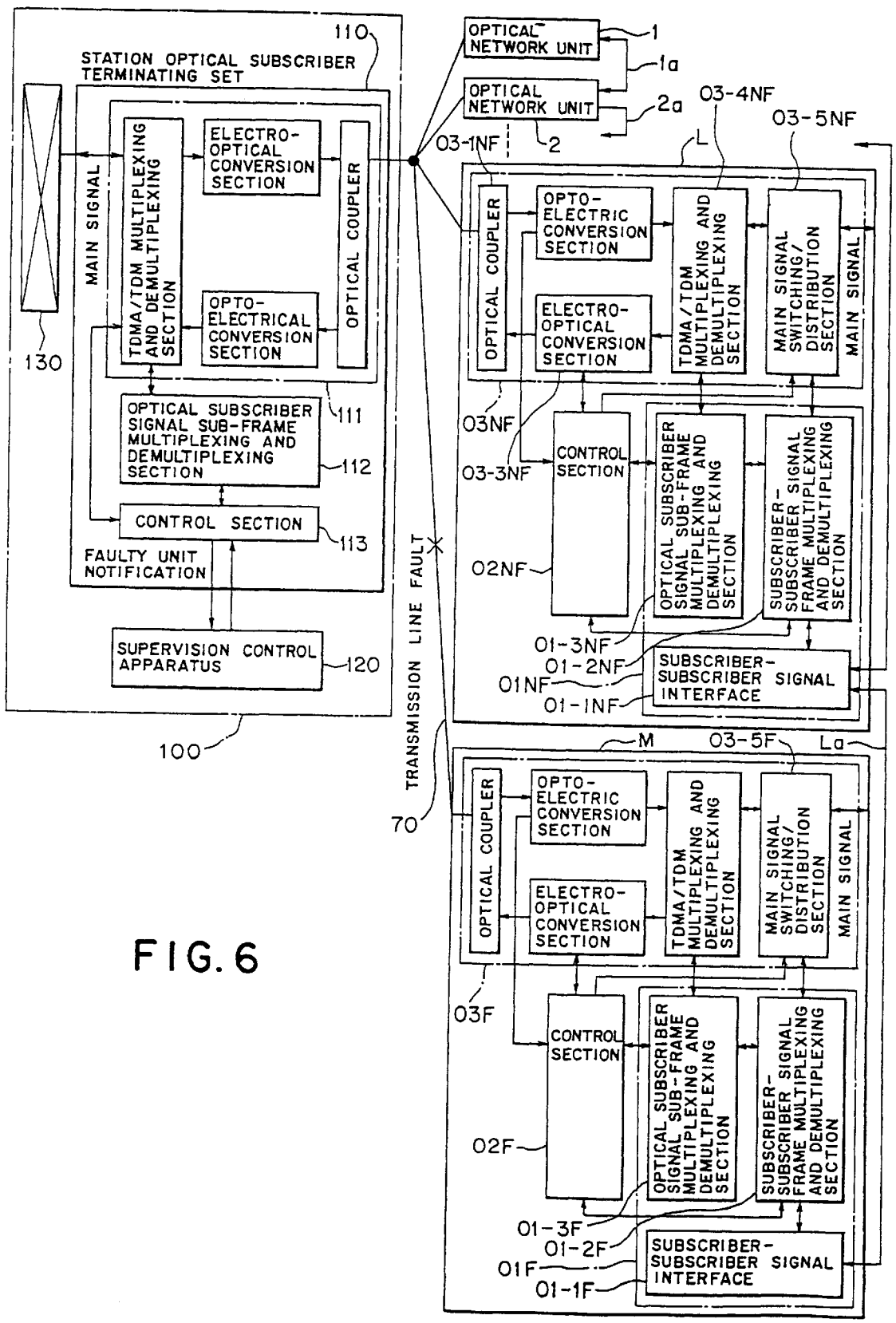
FIG. 6 is a block diagram of the optical subscriber network system of FIG. 1 in a condition wherein an optical network unit has some fault.

FIG. 6 shows the optical subscriber network (PON) system shown in FIG. 1 when an optical network unit (ONU) M (M is a natural number) has some fault. In the following description, a component of an optical network unit having some fault sometimes has a suffix F added thereto while a component of another optical network unit which does not have any fault sometimes has another suffix NF added thereto.

1A-1. When Some Fault is Present in a Transmission Line or a Transmission/reception System of an Optical Network Unit When the transmission line 70 of an optical network unit (ONU) M has some fault, the control section 02F of the optical network unit (ONU) M supervises the apparatus state of the self apparatus. If the control section 02F detects or recognizes a fault (failure) of the transmission line 70, then it controls the subscriber-subscriber signal frame multiplexing and demultiplexing section 01-2F to produce a subscriber-subscriber signal frame 20 which includes contents of the supervised apparatus state as a network unit mutual supervision controlling signal.

The subscriber-subscriber signal frame multiplexing and demultiplexing section 01-2F of the faulty optical network unit (ONU) M thus produces a subscriber-subscriber signal frame 20 under the control of the control section 02F and transmits the subscriber-subscriber signal frame 20 to the subscriber-subscriber signal interface 01-1F.

The subscriber-subscriber signal interface 01-1F of the faulty optical network unit (ONU) M transmits the subscriber-subscriber signal frame 20 sent thereto from the subscriber-subscriber signal frame multiplexing and demultiplexing section 01-2F into an available subscriber-subscriber bypass transmission line La in order to convey the subscriber-subscriber signal frame 20 to another next optical network unit (ONU) L (L is a natural number) which is operating regularly.

The faulty optical network unit (ONU) M transmits data of an apparatus state of the self apparatus to the next optical network unit (ONU) L, which is operating regularly, through the subscriber-subscriber bypass transmission line La.

In this manner, the faulty optical network unit (ONU) M includes means provided in the faulty network unit as one of the network units for transmitting a network unit mutual supervision controlling signal to non-faulty network units other than the faulty network unit through a bypass transmission line. In other words, the control section 02F, subscriber-subscriber signal frame multiplexing and demultiplexing section 01-2F and subscriber-subscriber signal interface 01-1F of the faulty optical network unit (ONU) M exhibits the function as the transmission means.

On the other hand, the subscriber-subscriber signal interface 01-1NF of the next optical network unit (ONU) L adjacent and connected to the faulty optical network unit (ONU) M by the subscriber-subscriber bypass transmission line La receives the subscriber-subscriber signal frame 20, which is network unit mutual supervision control information, from the faulty optical network unit (ONU) M and delivers the subscriber-subscriber signal frame 20 to the subscriber-subscriber signal frame multiplexing and demultiplexing section 01-2NF.

The control section 02NF controls the optical subscriber signal sub-frame multiplexing and demultiplexing section 01-3NF to produce a different subscriber information transmission sub-frame 31 using data of a state of the faulty optical network unit (ONU) M included in the subscriber-subscriber signal frame 20 from the faulty optical network unit (ONU) M.

The optical subscriber signal sub-frame multiplexing and demultiplexing section 01-3NF of the different optical network unit (ONU) L which operates regularly thus produces a different subscriber information transmission sub-frame 31 under the control of the control section 02NF, and the TDMA/TDM multiplexing and demultiplexing section 03-4NF divisionally inserts the different subscriber information transmission sub-frame 31 into part of main signal system data of upstream frames 30. The electro-optical conversion section 03-3NF of the main signal system section 03NF of the optical network unit (ONU) L which operates regularly performs electro-optical conversion of the upstream frames 30 which include the data of the apparatus state from the faulty optical network unit (ONU) M, and the resulting optical signal is transmitted into the corresponding transmission line 70 through the optical coupler 03-1NF so that it is transmitted to the station apparatus 100.

In this manner, the optical network unit (ONU) L which is operating regularly includes means for transmitting network unit supervision information received from the faulty optical network unit (ONU) M to the station apparatus through the optical transmission line connected to the non-faulty network unit. In particular, the optical subscriber signal sub-frame multiplexing and demultiplexing section 01-3NF, control section 02NF and so forth function as means for transmitting network unit supervision information to the station apparatus 100.

On the other hand, the optical subscriber signal sub-frame multiplexing and demultiplexing section 112 of the station apparatus 100 demultiplexes the different subscriber information transmission sub-frame (upstream) 31 which is network unit mutual supervision control information inserted in part of the upstream frames 30 transmitted thereto from the optical network unit (ONU) L which operates regularly, and sends the thus demultiplexed different subscriber information transmission sub-frame (upstream) 31 to the control section 113.

The control section 113 transmits, based on data included in the different subscriber information transmission sub-frame (upstream) 31 which is network unit mutual supervision control information, contents of the data to the supervision control apparatus 120.

The supervision control apparatus 120 specifically detects, based on the contents sent thereto from the control section 113, which one of the optical network units (ONU) is faulty, and delivers, when the faulty optical network unit (ONU) M should be stopped, an instruction to the control section 113 to transmit a stopping signal.

In this manner, the station apparatus 100 includes means for supervising a fault from network unit mutual supervision control information. In particular, the control section 113, supervision control apparatus 120, optical subscriber signal sub-frame multiplexing and demultiplexing section 112 and so forth function as means in the station apparatus 100 for supervising a fault from network unit mutual supervision control information.

1A-2. When an Optical Network Unit which Transmits an Irregular Upstream Frame is Present The control section 113 of the station apparatus 100 supervises whether or not an irregular upstream frame has been transmitted. If the control section 113 detects that an upstream frame has been transmitted at an irregular timing from a certain optical network unit (ONU), then it notifies the supervision control apparatus 120 of such detection and selectively transmits, in response to an instruction from the supervision control apparatus 120, a stopping signal to the certain optical network unit (ONU).

The optical subscriber signal sub-frame multiplexing and demultiplexing section 112 of the station apparatus 100 produces a different subscriber information transmission sub-frame (downstream) 41 under the control of the control section 113 and divisionally inserts the different subscriber information transmission sub-frame 41 into part of main signal system data of downstream frames 40.

The optical network unit (ONU) L transmits the different subscriber information transmission sub-frame (downstream) 41 received from the station apparatus 100 to the next optical network unit (ONU) M adjacent thereto through the subscriber-subscriber bypass transmission line La. Meanwhile, the control section 02F functions, if it confirms a signal included in the subscriber-subscriber signal frame 20 received through the subscriber-subscriber bypass transmission line La and representing that operation of the self unit should be stopped, to render the optical network unit (ONU) M into a stopping state.

Further, the supervision control apparatus 120 of the station apparatus 100 specifically detects an optical network unit (ONU) which transmits an irregular upstream frame based on the notification from the control section 113 that an irregular upstream frame has been received and the stopping instruction to the optical network unit (ONU) from the control section 113.

In this manner, the station apparatus 100 specifies an optical network unit (ONU) which has transmitted an irregular upstream frame. In particular, the supervision control apparatus 120, control section 113 and so forth have another function of specifying an optical network unit which transmits an irregular upstream frame.

1A-3. Communication 1A-3a. Request For Communication from an Optical Network Unit to the Station Apparatus In order to secure communication between the faulty optical network unit (ONU) M and the station apparatus 100, the control section 02F of the faulty optical network unit (ONU) M controls the subscriber-subscriber signal frame multiplexing and demultiplexing section 01-2F to produce a subscriber-subscriber signal frame 20 including information that communication with the station apparatus 100 is requested.

The subscriber-subscriber signal interface 01-1F of the faulty optical network unit (ONU) M receives a subscriber-subscriber signal frame 20 produced under the control of the control section 02F from the subscriber-subscriber signal frame multiplexing and demultiplexing section 01-2F and transmits it to the next optical network unit (ONU) L adjacent and connected thereto through the subscriber-subscriber bypass transmission line La.

The control section 02NF of the next optical network unit (ONU) L which has received the subscriber-subscriber signal frame 20 from the faulty optical network unit (ONU) M and operates regularly controls the optical subscriber signal sub-frame multiplexing and demultiplexing section 01-3NF to produce a different subscriber information transmission sub-frame (upstream) 31 based on contents included in the subscriber-subscriber signal frame 20.

The optical subscriber signal sub-frame multiplexing and demultiplexing section 01-3NF of the next optical network unit (ONU) L which operates regularly divides the different subscriber information transmission sub-frame 31 produced under the control of the control section 02NF and inserts the same into part of main signal system data of upstream frames 30.

In the main signal system section 03NF of the optical network unit (ONU) L which operates regularly, the electro-optical conversion section 03-3NF performs electro-optical conversion of the upstream frames 30, which include the information that communication with the station apparatus 100 is requested by the faulty optical network unit (ONU) M, and outputs the resulting optical signal to the transmission line 70 through the optical coupler 03-1NF so as to be transmitted to the station apparatus 100.

On the other hand, the control section 113 of the station apparatus 100 detects the requesting signal for communication from the faulty optical network unit (ONU) M included in the different subscriber information transmission sub-frame (upstream) 31 as network unit mutual supervision control information transmitted as a multi-frame together with the upstream frames 30 from the optical network unit (ONU) L which operates regularly.

In this manner, the requesting signal for communication from the faulty optical network unit (ONU) M is transmitted from the adjacent next optical network unit (ONU) L to the station apparatus 100 through the subscriber-subscriber bypass transmission line La.

Further, the control section 113 of the station apparatus 100 which has detected the requesting signal for communication from the faulty optical network unit (ONU) M selects, in order to secure communication with the faulty optical network unit (ONU) M, one of those optical network units (ONU) which are adjacent and connected to the faulty optical network unit (ONU) M by the subscriber-subscriber bypass transmission line La and sets two communication lines between the optical network unit (ONU) L selected as a repeating unit and the station apparatus 100. It is to be noted that the band of the newly set communication lines in which communication data from the faulty optical network unit (ONU) M is transmitted is narrower than the band of the other communication lines.

Here, the control section 113 which selects a repeating unit controls, in order to transmit to the optical network unit (ONU) L selected as a repeating unit a signal representing that the optical network unit (ONU) L has been selected as such, the optical subscriber signal sub-frame multiplexing and demultiplexing section 112 to produce a different subscriber information transmission sub-frame 41 which includes contents of such selection and controls the faulty optical network unit (ONU) M to produce another different subscriber information transmission sub-frame 41 which includes information of the optical network unit (ONU) L selected as a repeating unit.

Downstream frames 40 which have, divisionally inserted in part of main signal system data thereof, the different subscriber information transmission sub-frame (downstream) 41 which includes the control information produced under the control of the control section 113 is subject to electro-optical conversion and so forth by the electro-optical conversion section 111-2 of the main signal system section 111 and transmitted to the optical fiber 60 through the optical coupler 111-1.

Then, the control section 02NF of the optical network unit (ONU) L which has been selected as a repeating unit and operates regularly detects, from the control information included in the different subscriber information transmission sub-frame (downstream) 41 demultiplexed from the downstream frames 40 by the optical subscriber signal sub-frame multiplexing and demultiplexing section 01-3NF, the signal representing that the optical network unit (ONU) L has been selected as a repeating unit.

Further, the optical network unit (ONU) L which operates regularly transmits the signal included in the different subscriber information transmission sub-frame (downstream) 41 received from the station apparatus 100 using a subscriber-subscriber signal frame 20 to the faulty optical network unit (ONU) M through the subscriber-subscriber bypass transmission line La. The control section 02F of the faulty optical network unit (ONU) M thus recognizes based on the control information from the station apparatus 100 included in the subscriber-subscriber signal frame 20 that the optical network unit (ONU) L which operates regularly has been selected as a repeating unit, and controls so that transmission and reception of a signal to and from the station apparatus 100 is performed through the medium of the repeating unit.

1A-3b. Communication from a Faulty Optical Network Unit to the Station Apparatus The control section 02F of the faulty optical network unit (ONU) M performs, in order to send main signal system data destined for the station apparatus 100 to the optical network unit (ONU) L which operates regularly, switching control of the main signal switching/distribution section 03-5F to send the main signal data to the subscriber-subscriber signal frame multiplexing and demultiplexing section 01-2F, and controls the subscriber-subscriber signal frame multiplexing and demultiplexing section 01-2F to produce a subscriber-subscriber signal frame 20 which includes the main signal data.

The subscriber-subscriber signal frame multiplexing and demultiplexing section 01-2F transmits the subscriber-subscriber signal frame 20 produced under the control of the control section 02F to the subscriber-subscriber signal interface 01-1F. The subscriber-subscriber signal interface 01-1F transmits the subscriber-subscriber signal frame 20 to the optical network unit (ONU) L which operates regularly and acts as a repeating apparatus through the subscriber-subscriber bypass transmission line La.

In this manner, the faulty optical network unit (ONU) M has a function of transmission means for transmitting communication data to the non-faulty optical network unit (ONU) L through the subscriber-subscriber bypass transmission line La. In particular, the subscriber-subscriber signal frame multiplexing and demultiplexing section 01-2F, subscriber-subscriber signal interface 01-1F, control section 02F and so forth function as transmission means for transmitting transmission data to the non-faulty optical network unit (ONU) L through the subscriber-subscriber bypass transmission line La.

On the other hand, the control section 02NF of the optical network unit (ONU) L which operates regularly and plays a role as a repeating apparatus controls the subscriber-subscriber signal frame multiplexing and demultiplexing section 01-2NF to send the communication data included in the subscriber-subscriber signal frame 20 received through the subscriber-subscriber bypass transmission line La and destined for the station apparatus 100 from the faulty optical network unit (ONU) M to the main signal switching/distribution section 03-5NF.

The main signal system section 03NF, subscriber-subscriber signal frame multiplexing and demultiplexing section 01-2NF and so forth of the optical network unit (ONU) L which acts as a repeating unit exhibit a function as means for transmitting communication data received through the subscriber-subscriber bypass transmission line La and destined for the station apparatus 100 from the faulty optical network unit (ONU) M to the station apparatus 100.

It is to be noted here that the communication data from the faulty optical network unit (ONU) M is transmitted using one of the two lines set between the optical network unit (ONU) L acting as a repeating apparatus and the station apparatus 100 which has been set newly and has a narrower band.

Further, the control section 113 of the station apparatus 100 controls, when it detects the upstream frame 30 from the repeating unit which includes the communication data from the faulty optical network unit (ONU) M, to transmit the main signal system data of the upstream frame 30 as a main signal from the faulty optical network unit (ONU) M to the exchange 130.

1A-3c. Communication from the Station Apparatus to a Faulty Optical Network Unit The control section 113 of the station apparatus 100 controls so that communication data to be transmitted from the exchange 130 to the faulty optical network unit (ONU) M may be transmitted as a downstream frame to the repeating unit using a narrower band from between the two lines set between the repeating unit (ONU) L and the station apparatus 100.

The main signal system section 111 performs multiplexing or demultiplexing of the TDMA/TDM multiplexing and demultiplexing section 111-4, electro-optical conversion of the electro-optical conversion section 111-2 and so forth under the control of the control section 113 and transmits a resulting signal into the optical fiber 60 using a line of a narrower band set between the station apparatus 100 and the optical network unit (ONU) L.

The downstream frame including the communication data destined for the faulty optical network unit (ONU) M is transmitted to the optical network unit (ONU) L in this manner.

Meanwhile, the control section 02NF of the optical network unit (ONU) L which acts as a repeating unit performs, if it detects a downstream frame which has received from the line set newly and includes communication data destined for the faulty optical network unit (ONU) M, switching control of the main signal switching/distribution section 03-5NF so that the communication data destined for the optical network unit (ONU) M may be distributed to the subscriber-subscriber signal frame multiplexing and demultiplexing section 01-2 and further controls the subscriber-subscriber signal frame multiplexing and demultiplexing section 01-2NF to produce a subscriber-subscriber signal frame 20 which includes the communication data to the optical network unit (ONU) M.

The subscriber-subscriber signal interface 01-1NF receives the subscriber-subscriber signal frame 20 produced under the control of the control section 02NF from the subscriber-subscriber signal frame multiplexing and demultiplexing section 01-2NF and transmits it to the subscriber-subscriber bypass transmission line La.

In this manner, the optical network unit (ONU) L serving as a repeating unit has a function as means for transmitting the communication data received from the station apparatus 100 to the faulty optical network unit (ONU) M through the subscriber-subscriber bypass transmission line La. In particular, at least the control section 02NF, main signal switching/distribution section 03-5NF, subscriber-subscriber signal interface 01-1NF and so forth function as means for transmitting communication data to the faulty optical network unit (ONU) M through the subscriber-subscriber bypass transmission line La.

On the other hand, the subscriber-subscriber signal interface 01-1F of the faulty optical network unit (ONU) M receives the subscriber-subscriber signal frame 20 including the communication data from the station apparatus 100 through the subscriber-subscriber bypass transmission line La and sends it to the subscriber-subscriber signal frame multiplexing and demultiplexing section 01-2F.

The control section 02F performs, when it detects reception of the subscriber-subscriber signal frame 20 including the communication data from the station apparatus 100, control of main signal switching in order to send the communication data included in the subscriber-subscriber signal frame 20 as a main signal to the main signal switching/distribution section 03-5F

In this manner, the faulty optical network unit (ONU) M has a function of means for receiving the communication data from the non-faulty optical network unit (ONU) L. In particular, at least the control section 02F, subscriber-subscriber signal interface 01-1F, subscriber-subscriber signal frame multiplexing and demultiplexing section 01-2F and so forth function as means for receiving communication data from the non-faulty optical network unit (ONU) L.

It is to be noted here that, similarly to the adjacent optical network unit (ONU) L which operates regularly, also the faulty optical network unit (ONU) M has means for transmitting network unit mutual supervision control information to the station apparatus 100 through the optical transmission lines 70 and 60 and further has means for transmitting network unit mutual supervision control information received from the station apparatus 100 to the adjacent optical network unit (ONU) L through the subscriber-subscriber bypass transmission line La. Furthermore, the faulty optical network unit (ONU) M has means for transmitting communication data received from the adjacent optical network unit (ONU) L to the station apparatus 100 through the optical transmission lines 70 and 60 connected to the faulty optical network unit (ONU) M and further has means for receiving communication data from the adjacent optical network unit (ONU) L.

On the other hand, also the adjacent optical network unit (ONU) L which operates regularly has, similarly to the faulty optical network unit (ONU) M, means for transmitting a network unit mutual supervision controlling signal to the different optical network unit (ONU) M through the subscriber-subscriber bypass transmission line La and further has means for receiving network unit mutual supervision control information from the optical network unit (ONU) M. The optical network unit (ONU) L further has transmission means for transmitting communication data to the optical network unit (ONU) M through the subscriber-subscriber bypass transmission line La and further has means for receiving communication data from the optical network unit (ONU) M.

In the optical subscriber network system 200 having the construction described above, when the optical network units (ONU) 1 to n operate regularly, each of the optical network units (ONU) 1 to n transmits or receives a subscriber-subscriber signal frame 20 which includes apparatus state data of an adjacent optical network unit as a network unit mutual supervision controlling signal through an available one of the subscriber-subscriber bypass transmission lines 1a to (n-1)a, divides a different subscriber information transmission sub-frame (upstream) 31 as network unit mutual supervision control information of contents of the received data of the apparatus state of another optical network unit, inserts the divided different subscriber information transmission sub-frame 31 into part of main signal system data of upstream frames 30.

Meanwhile, the station apparatus 100 supervises a fault by means of the control section 113 and the supervision control apparatus 120 using data of apparatus states of the optical network units (ONU) 1 to n included in the different subscriber information transmission sub-frames 31 as network unit mutual supervision control information transmitted from the optical network units (ONU) 1 to n.

Each of the optical network units (ONU) 1 to n places communication data to be transmitted from the self apparatus to the station apparatus 100 into a field of main signal system data of an upstream frame 30 and transmits it to the station apparatus 100. Meanwhile, the different subscriber information transmission sub-frames 31 are placed into the field of main signal system data in upstream frames 30, in which communication data are placed, and transmitted to the station apparatus 100.

On the other hand, communication data to be transmitted from the station apparatus 100 to the optical network units (ONU) 1 to n are placed into a field of main signal system data of downstream frames 40 and transmitted to the optical network units (ONU) 1 to n. Further, control information to each of the optical network units (ONU) 1 to n is placed as a different subscriber information transmission sub-frame 41 into and transmitted together with the main signal system data field of the downstream frames 40.

In the following, operation of an optical network unit in the present invention when the optical subscriber network is faulty is described in detail for different cases.

Figure 7:
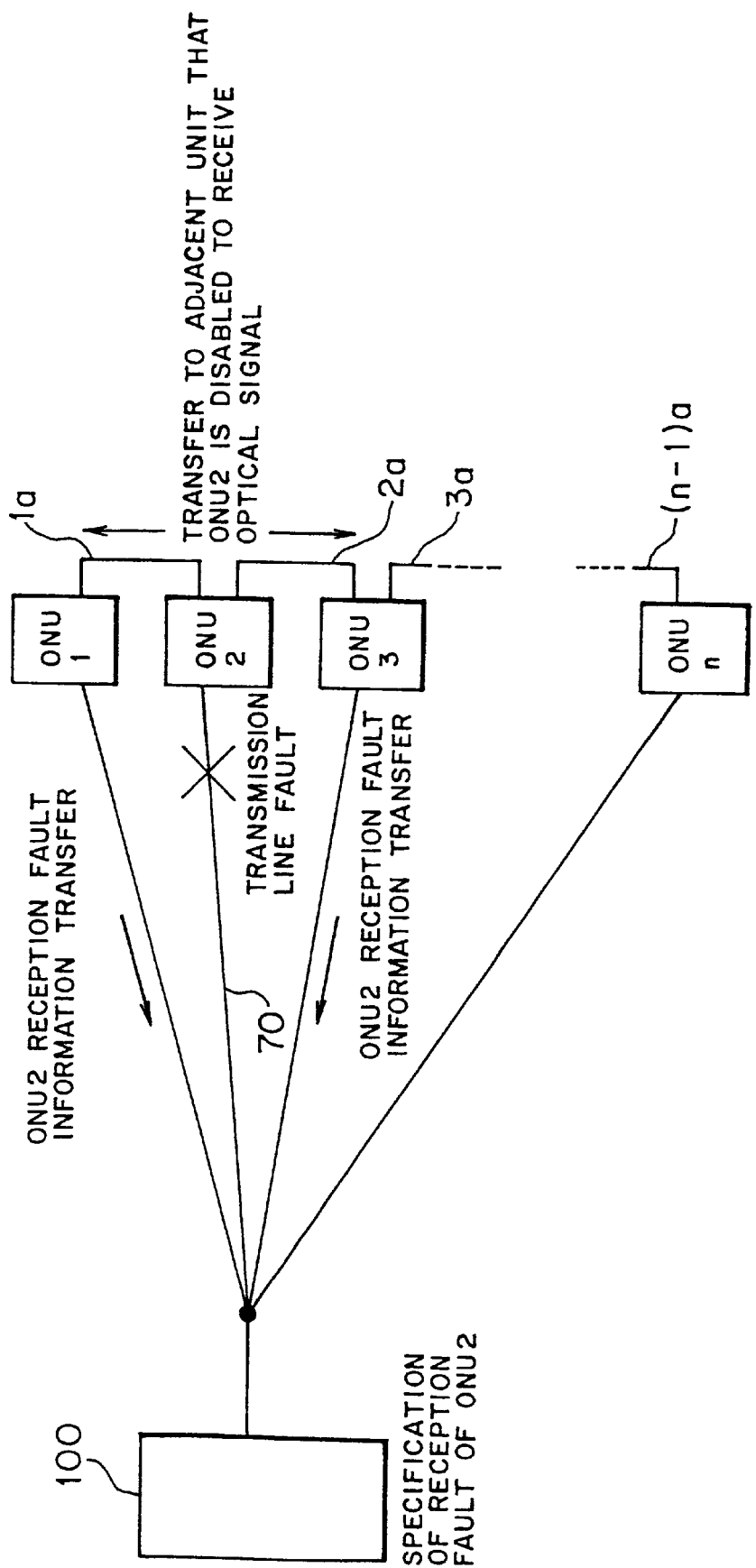
FIG. 7 is a diagrammatic view of the optical subscriber network system of FIG. 1 when a downstream signal from the station apparatus cannot be received regularly.
Figure 8:
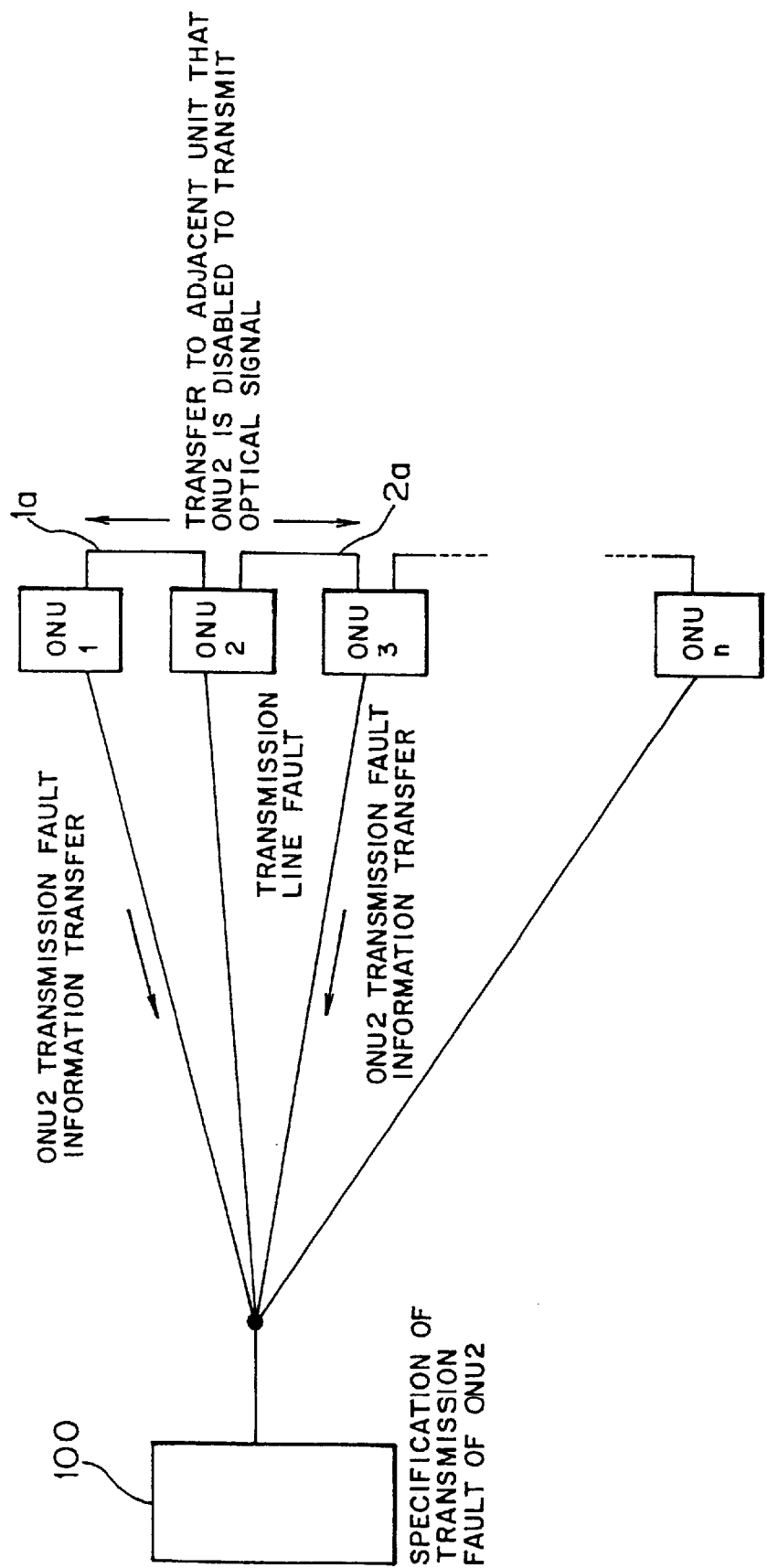
FIG. 8 is a diagrammatic view of the optical subscriber network system of FIG. 1 when an optical transmission apparatus fails.

1B-1. When a Communication Fault is Present 1B-1-1. From an Optical Network Unit to the Station Apparatus FIG. 7 is a diagrammatic view of the optical subscriber network (PON) system of the present invention when the transmission line 70 from the optical distributor-coupler 50 to the optical network unit (ONU) 2 is faulty, and FIG. 8 is a similar view but showing the optical subscriber network (PON) system when the optical network unit (ONU) 2 is faulty. When the optical subscriber network (PON) system is in the state shown in FIG. 7, the control section 02 of the optical network unit (ONU) 2 linked with the faulty transmission line 70 detects from a reception condition of an optical signal from the station apparatus 100 or the like that the transmission line 70 has some fault.

The control section 02 thus controls the subscriber-subscriber signal frame multiplexing and demultiplexing section 01-2 to produce a subscriber-subscriber signal frame 20 as a network unit mutual supervision controlling signal which includes information representing that the transmission line 70 linked with the self apparatus has some fault.

The subscriber-subscriber signal frame multiplexing and demultiplexing section 01-2 thus delivers the subscriber-subscriber signal frame 20 produced under the control of the control section 02 to the subscriber-subscriber signal interface 01-1. The subscriber-subscriber signal interface 01-1 thus transmits the subscriber-subscriber signal frame 20 to optical network units adjacent the self apparatus through the subscriber-subscriber bypass transmission lines 1a and 2a.

In this manner, when the optical transmission line between the station apparatus 100 and a particular optical network unit (ONU) 2 of the plurality of optical network units (ONU) 1 to n has some fault, a network unit mutual supervision controlling signal from the particular optical network unit (ONU) 2 is transmitted to bypass transmission lines. In particular, since the faulty optical network unit (ONU) 2 at least includes the control section 02F, subscriber-subscriber signal frame multiplexing and demultiplexing section 01-2F, subscriber-subscriber signal interface 01-1F and so forth, it transmits a network unit mutual supervision controlling signal to the non-faulty optical network units (ONU) 1 and 3 through the subscriber-subscriber bypass transmission lines 1a and 2a, respectively.

Each of the optical network unit (ONU) 1 and 3 adjacent and connected to the optical network unit (ONU) 2 through the subscriber-subscriber bypass transmission lines 1a and 2a, respectively, receives a subscriber-subscriber signal frame 20 from the faulty optical network unit (ONU) 2. The subscriber-subscriber signal frame 20 is transferred to the subscriber-subscriber signal frame multiplexing and demultiplexing section 01-2.

Here, the control section 02 of each of the optical network units (ONU) 1 and 3 controls, in order to transmit contents included in the subscriber-subscriber signal frame 20 to the station apparatus 100, the optical subscriber signal sub-frame multiplexing and demultiplexing section 01-3 to produce a different subscriber information transmission sub-frame 31 as network unit mutual supervision control information which includes contents of the apparatus state of the faulty optical network unit (ONU) 2.

The optical subscriber signal sub-frame multiplexing and demultiplexing section 01-3 thus divides the different subscriber information transmission sub-frame 31 produced under the control of the control section 02 and inserts it into part of main signal system data of upstream frames 30.

Then, the data of the apparatus state of the faulty optical network unit (ONU) 2 is sent to the adjacent optical network units (ONU) 1 and 3 through the subscriber-subscriber bypass transmission lines 1a and 2a and is electro-optically converted by the electro-optical conversion section 03-3 of the main signal system section 03 of the each of the adjacent optical network units (ONU) 1 and 3, whereafter it is transmitted to the station apparatus 100 through the transmission lines 70.

In this manner, the network unit mutual supervision controlling signals from the faulty optical network unit (ONU) 2 are received by the optical network units (ONU) 1 and 3 adjacent and connected to the optical network unit (ONU) 2 through the subscriber-subscriber bypass transmission lines 1a and 2a, respectively, and the network unit mutual supervision control information thus received is transmitted to the station apparatus 100 through the available optical transmission lines.

On the other hand, in the station apparatus 100, the optical subscriber signal sub-frame multiplexing and demultiplexing section 112 extracts the different subscriber information transmission sub-frame (upstream) 31 from the upstream frames 30, and the control section 113 discriminates from the apparatus state data of the optical network unit (ONU) 2 included in the different subscriber information transmission sub-frame 31 that the optical network unit (ONU) 2 is faulty, and then conveys contents of the discrimination to the supervision control apparatus 120.

Consequently, the supervision control apparatus 120 detects based on the information from the control section 113 at which place in the network a fault has occurred or grasps contents of the failure, and notifies a maintenance engineer of the unit that a fault has occurred with the unit.

In this manner, the station apparatus 100 which receives network unit mutual supervision control information supervises a fault of the network units.

It is to be noted that similar operation is performed also when a fault is present in the transmission/reception system or the like of the optical network unit (ONU) 2. In particular, referring to FIG. 8, from the optical network unit (ONU) 2 which has detected presence of a fault in the transmission system thereof, a subscriber-subscriber signal frame 20 is transmitted as a subscriber mutual supervision controlling signal to the ADJACENT optical network units (ONU) 1 and 3 through the subscriber-subscriber bypass transmission lines 1a and 2a. Each of the optical network units (ONU) 1 and 3 which have received the subscriber-subscriber signal frame 20 from the faulty optical network unit (ONU) 2 which includes the apparatus state produces a different subscriber information transmission sub-frame 31 and transmits the different subscriber information transmission sub-frame (upstream) 31 together with upstream frames 30 to the station apparatus 100.

Then, the station apparatus 100 uses the different subscriber information transmission sub-frames (upstream) 31 from the adjacent optical network units (ONU) 1 and 3 adjacent and connected to the faulty optical network unit (ONU) 2 through the subscriber-subscriber bypass transmission lines 1a and 2a to detect that the optical network unit (ONU) 2 is faulty, and notifies a maintenance engineer of the station apparatus 100 of such detection.

1B-1-2. From the Station Apparatus to an Optical Network Unit

In the station apparatus 100, a different subscriber information transmission sub-frame 41 as network unit mutual supervision control information which includes contents of control (data) to be conveyed to the faulty optical network unit (ONU) 2 is produced by the optical subscriber signal sub-frame multiplexing and demultiplexing section 112 under the control of the control section 113 and then placed into part of main signal system data of downstream frames 40, whereafter it is electro-optically converted by the electro-optical conversion section 111-2 of the main signal system section 111 and transmitted into the optical fiber 60.

Each of the optical network units (ONU) 1 and 3 adjacent and connected to the faulty optical network unit (ONU) 2 through the subscriber-subscriber bypass transmission lines 1a and 2a, respectively, extracts, from the downstream frames 40, the control information from the station apparatus 100 to the adjacent optical network unit (ONU) 2, produces a subscriber-subscriber signal frame 20 as a network unit mutual supervision controlling signal and transmits the control information to the faulty optical network unit (ONU) 2.

It is to be noted that whether a requirement for stopping of functions and so forth of the optical network unit (ONU) 2 depends upon one or both of signals from the adjacent optical network units (ONU) 1 and 3 relies upon the design of a maintenance engineer of the station apparatus 100 and so forth.

In the faulty optical network unit (ONU) 2, the control section 02 performs control of the optical network unit (ONU) 2 based on contents included in the subscriber-subscriber signal frames 20 received from the adjacent optical network units (ONU) 1 and 3. For example, if the control information from the station apparatus 100 is a function (operation) stopping signal for the optical network unit, then the control section 02 stops the functions of the optical network unit (ONU) 2.

Figure 9:
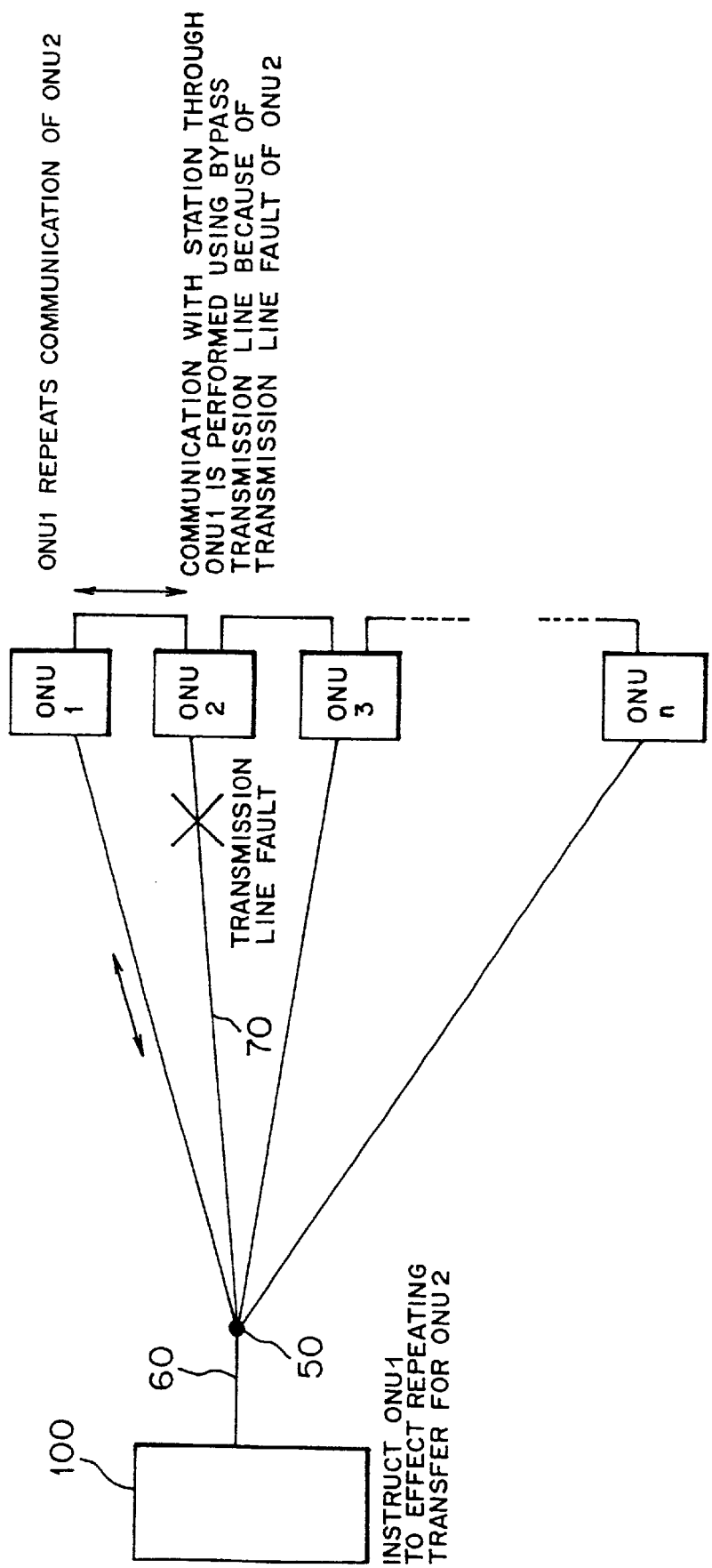
FIG. 9 is a diagrammatic view of the optical subscriber network system of FIG. 1 when an optical network unit which has some fault and the station apparatus communicate with each other.

1B-2. Communication of a Faulty Optical Network Unit 1B-2-1. Request for Communication FIG. 9 shows the optical subscriber network (PON) system of the present invention when, while the optical transmission line between the station apparatus 100 and the optical network unit (ONU) 2 is faulty or the optical transmission/reception system of the optical network unit (ONU) 2 suffers from a fault, it is tried to secure communication between the faulty optical network unit (ONU) 2 and the station apparatus 100.

In this instance, the faulty optical network unit (ONU) 2 which wants to secure communication with the station apparatus 100 places a requesting signal for communication as a network unit mutual supervision controlling signal into a subscriber-subscriber signal frame 20 and transmits the subscriber-subscriber signal frame 20 to each of the adjacent optical network units (ONU) 1 and 3 through the subscriber-subscriber bypass transmission lines 1a and 2a, respectively.

Thus, each of the optical network units (ONU) 1 and 3 having received the subscriber-subscriber signal frame 20 from the faulty optical network unit (ONU) 2 through the subscriber-subscriber bypass transmission lines 1a and 2a produces a different subscriber information transmission sub-frame (upstream) 31 as network unit mutual supervision control signal including the requesting signal for communication and transmits the different subscriber information transmission sub-frame 31 together with upstream frames 30 to the station apparatus 100.

In the station apparatus 100, the control section 113 detects the communication requesting signal included in the different subscriber information transmission sub-frames (upstream) 31 from the optical network units (ONU) 1 and 3 adjacent and connected to the faulty optical network unit (ONU) 2 through the subscriber-subscriber bypass transmission lines 1a and 2a, selects one of the optical network units (ONU) 1 and 3 adjacent and connected to the faulty optical network unit (ONU) 2 through the subscriber-subscriber bypass transmission lines 1a and 2a as a repeating unit, and notifies the optical network unit (ONU) 1, which has thus been selected as a repeating unit, and the faulty optical network unit (ONU) 2 of such selection.

In the following, description is given on condition that the optical network unit (ONU) 1 has been selected as a repeating unit.

On the other hand, the station apparatus 100 notifies a maintenance engineer of the optical network unit (ONU) 1 based on the information from the control section 113 that the optical network unit (ONU) 1 has been selected as a repeating unit for the faulty optical network unit (ONU) 2

It is to be noted that, when the requesting signal for communication from the faulty optical network unit (ONU) 2 is detected by the station apparatus 100 side, control for selecting a repeating unit may not be performed automatically by the control section 113, but the control section 113 may alternatively receive an instruction from the supervision control apparatus 120 and select a repeating unit in response to the received instruction.

1B-2-2. Transmission of Communication Data from a Faulty Optical Network Unit

In the following, description is given of a case wherein the optical network unit (ONU) 1 is selected as a repeating unit.

In the faulty optical network unit (ONU) 2, in order to transmit a main signal destined for the station apparatus 100 not into the transmission line 70 but into the subscriber-subscriber bypass transmission line 1a, the control section 02 sends a main signal switching signal to the main signal switching/distribution section 03-5 and controls the subscriber-subscriber signal frame multiplexing and demultiplexing section 01-2 to produce a subscriber-subscriber signal frame 20 in which main signal system data are included. Then, the subscriber-subscriber signal frame 20 is transmitted into the subscriber-subscriber bypass transmission line 1a lined to the optical network unit (ONU) 1 selected as a repeating unit.

In the optical network unit (ONU) 1 selected as a repeating unit, the electro-optical conversion section 03-3 performs electro-optical conversion and so forth for a main signal from the faulty optical network unit (ONU) 2 received through the subscriber-subscriber bypass transmission line 1a using a narrower band from the main signal switching/distribution section 03-5 and transmits the resulting signal to the station apparatus 100.

Figure 10:
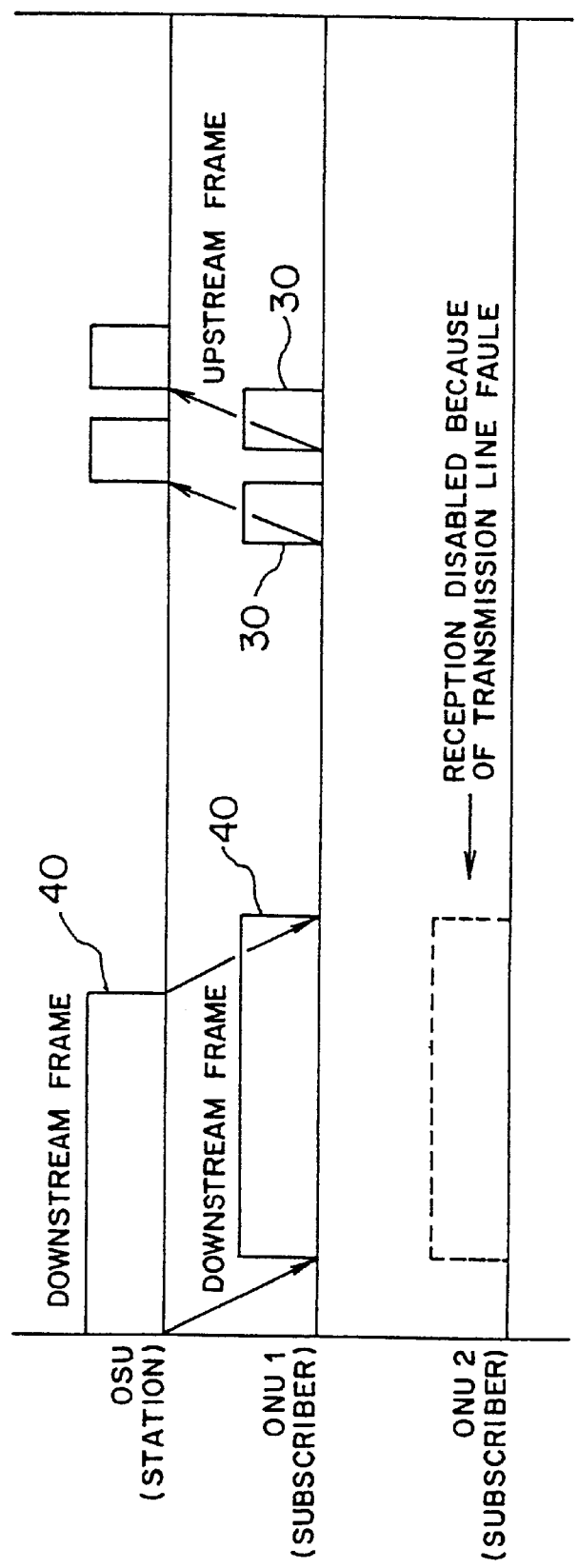
FIG. 10 is a diagram illustrating operation of the optical subscriber network system of FIG. 1 when an optical network unit has some fault.

FIG. 10 illustrates operation of the optical subscriber network (PON) when the optical network unit (ONU) 2 has some fault. Referring to FIG. 10, since the optical network unit (ONU) 2 is faulty, reception data are received by the optical network unit (ONU) 1 which serves as a repeating unit, but transmission data from the optical network unit (ONU) 2 destined for the station apparatus 100 is repeated by the optical network unit (ONU) 1 and transmitted to the station apparatus 100.

Meanwhile, in the station apparatus 100, the optical signal transmitted in the narrower band from the optical network unit (ONU) 1 selected as a repeating unit is subject to opto-electric conversion and so forth by the main signal system section 111, and the control section 113 transmits the resulting signal as a signal from the optical network unit (ONU) 2 to the exchange 130.

In this manner, when the optical transmission line between an optical network unit (ONU) 2 of the plurality of optical network units (ONU) 1 to n and the station apparatus 100 is faulty or when the optical network unit (ONU) 2 is faulty, communication data from the optical network unit (ONU) 2 is transmitted to the station apparatus 100 through the subscriber-subscriber bypass transmission line 1a, past the non-faulty optical network unit (ONU) 1 other than the optical network unit (ONU) 2 and through the optical transmission line between the non-faulty optical network unit (ONU) 1 and the station apparatus 100.

1B-2-3. Reception of Communication Data by a Faulty Optical Network Unit

The station apparatus 100 transmits, in order to transmit communication data destined form the faulty optical network unit (ONU) 2 to the optical network unit (ONU) 1 selected as a repeating unit by the control section 113, the communication data using one of the lines linked from the main signal system section 111 with the repeating unit which has a narrower band.

Then, in the repeating unit, in order for the main signal system section 03 to transmit the communication data sent thereto in the narrower band from the subscriber-subscriber bypass transmission line 1a, the control section 02 controls the main signal switching/distribution section 03-5 to send the communication data transmitted thereto in the narrower band to the subscriber-subscriber signal frame multiplexing and demultiplexing section 01-2, by which the communication data is placed into a subscriber-subscriber signal frame 20. The resulting subscriber-subscriber signal frame 20 is transmitted into the subscriber-subscriber bypass transmission line 1a linked with the faulty optical network unit (ONU) 2.

The faulty optical network unit (ONU) 2 thus sends the communication data from the repeating unit to the main signal switching/distribution section 03-5 through the subscriber-subscriber bypass transmission line 1a and transmits the main signal to a lower order terminal unit or the like.

In this manner, when the optical transmission line between a certain optical network unit (ONU) 2 from among the optical network units (ONU) 1 to n and the station apparatus 100 is faulty or when the particular optical network unit (ONU) 2 is faulty, communication data from the station apparatus 100 is transmitted to the particular optical network unit (ONU) 2 through the optical network unit (ONU) 1 other than the particular optical network unit (ONU) 2 and further through the subscriber-subscriber bypass transmission line 1a.

It is to be noted that the transmission capacity to be compensated for of the band for station-subscriber communication when a network unit has a fault is determined by the apparatus cost and the capacity of the bypass transmission lines between the subscribers. When the subscriber apparatus and the bypass transmission lines can have sufficient capacities, station-subscriber communication of the least degenerated capacity necessary for communication and so forth when no fault occurs is secured.

1B-3. Reduction of Irregular Upstream Frames

In the optical subscriber network (PON) system of the present invention, if transmission of an irregular upstream frame 30 from the optical network unit (ONU) 2 is detected by the control section 113 of the station apparatus 100, then the control section 113 selectively and successively transmits optical signal stopping instructions to some of the optical network units (ONU) 1 to n in the optical subscriber network (PON) into the optical fiber 60. It is to be noted that the number or the order of the optical network units to be selected as a destination of transmission of optical signal stopping instructions relies upon designing of a maintenance engineer and so forth.

Here, the optical signal stopping instructions are transmitted directly as an optical signal to each of the optical network units (ONU) 1 to n. Then, the control section 02 of any optical network unit which has received the optical signal stopping instruction to another optical network unit adjacent thereto through a subscriber-subscriber bypass transmission line outputs the optical signal stopping instruction to the subscriber-subscriber bypass transmission line.

Figure 11:
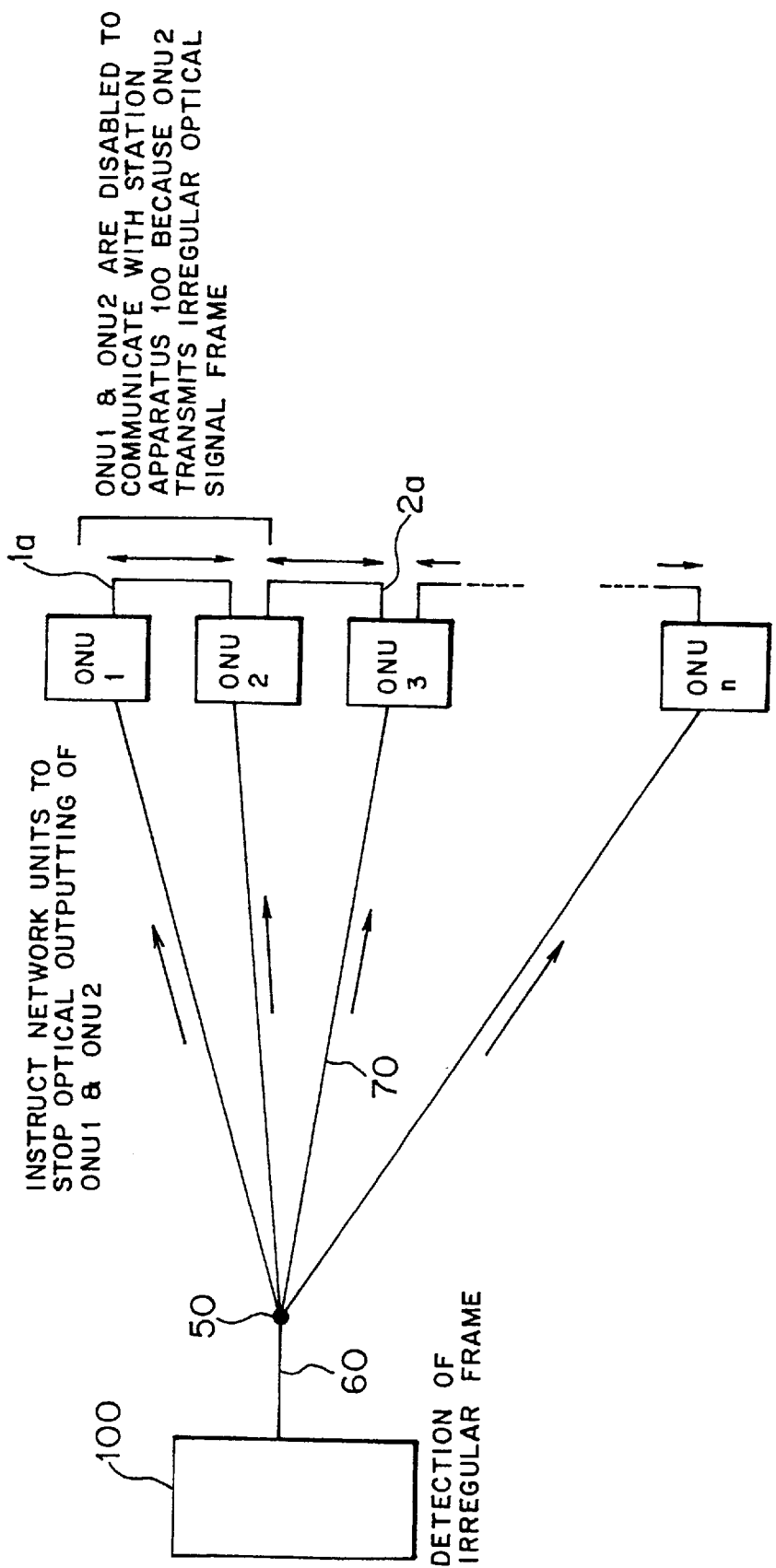
FIG. 11 is a diagrammatic view of the optical subscriber network system of FIG. 1 when a network unit transmits an irregular upstream frame and the irregular upstream frame interferes with the communication of the network unit itself and communication of another network unit.
Figure 12:
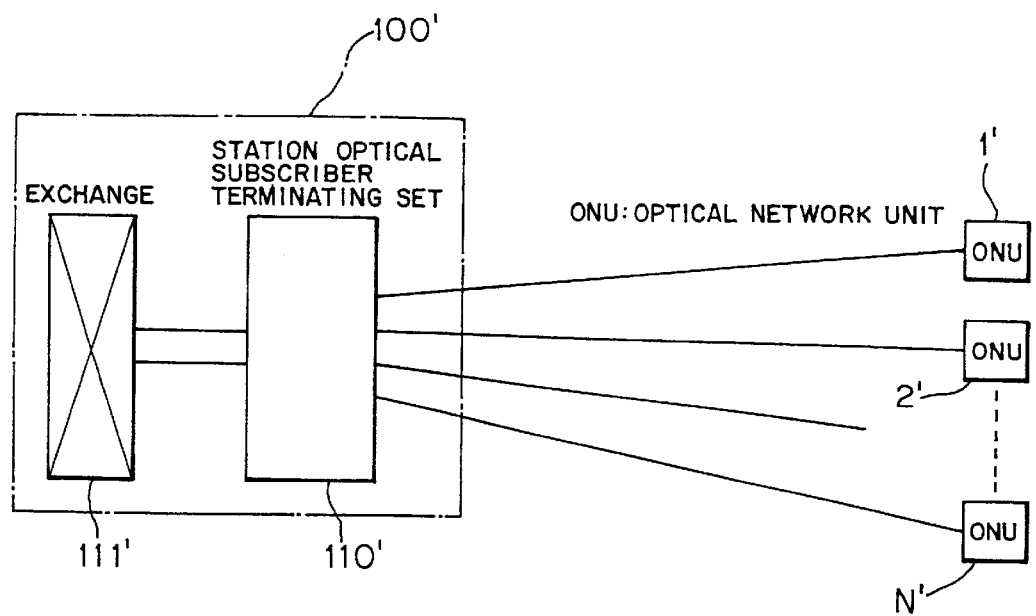
FIG. 12 is a diagrammatic view showing a construction of an ordinary station subscriber network.
Figure 13:
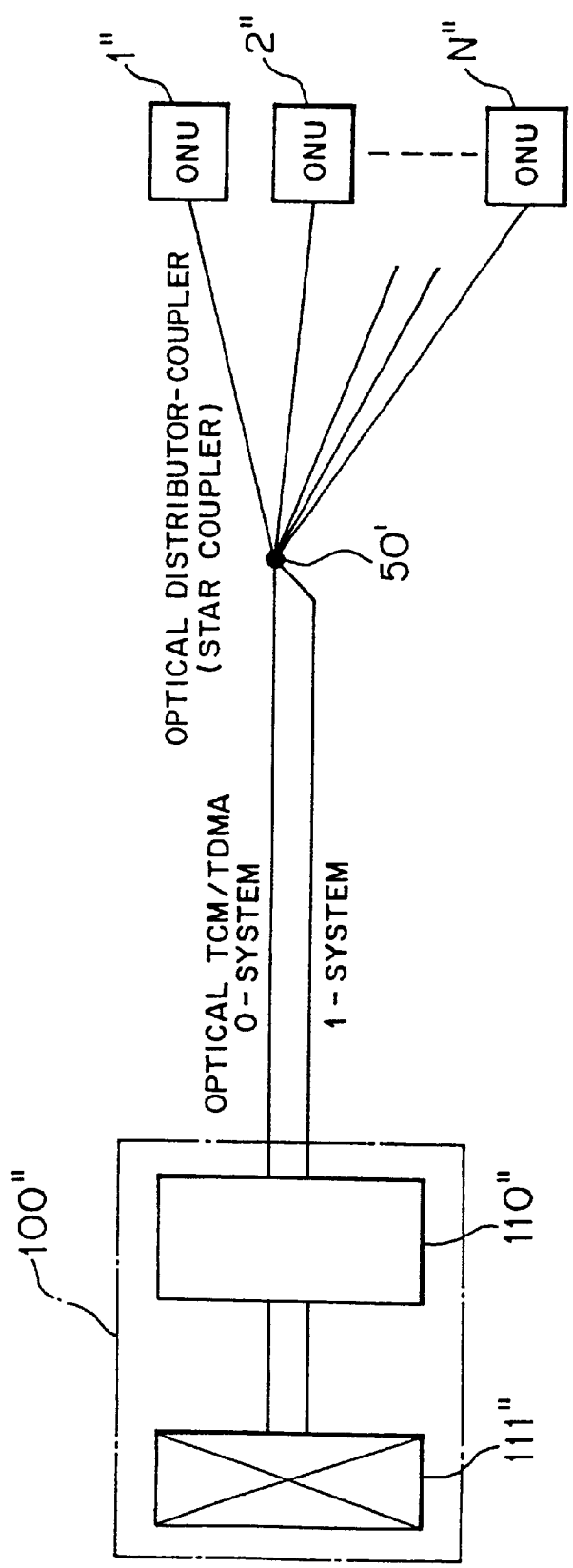
FIG. 13 is a diagrammatic view showing a construction of an ordinary passive optical network.
Figure 14:
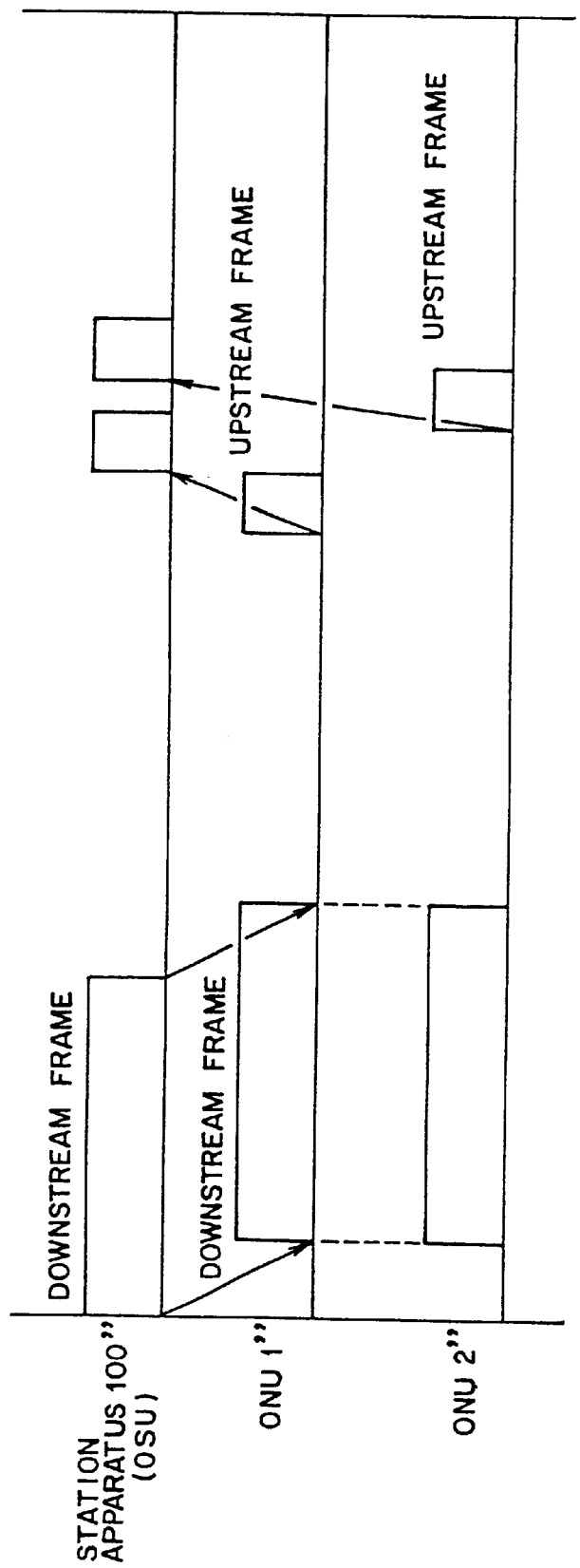
FIG. 14 is a diagram illustrating a construction of a frame of TDM/TDMA.
Figure 15:
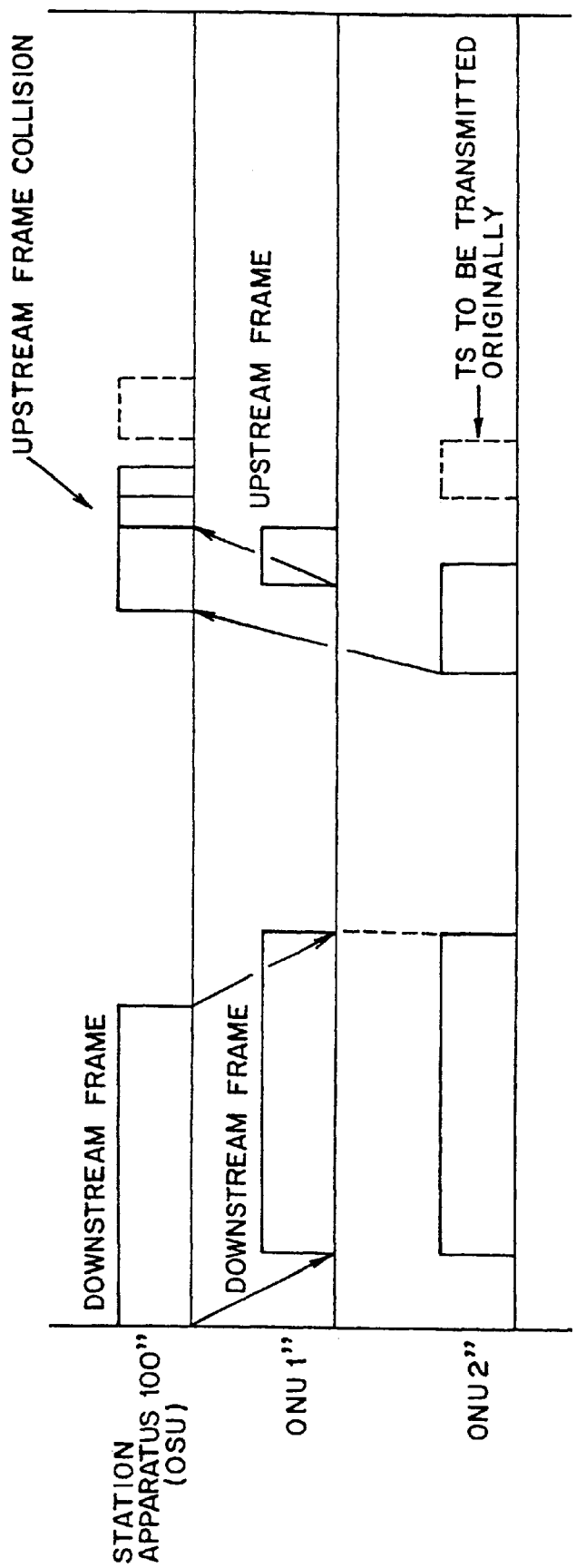
FIG. 15 is a diagram illustrating an example of communication interference between station subscribers of network units which are operating regularly.
Figure 16:
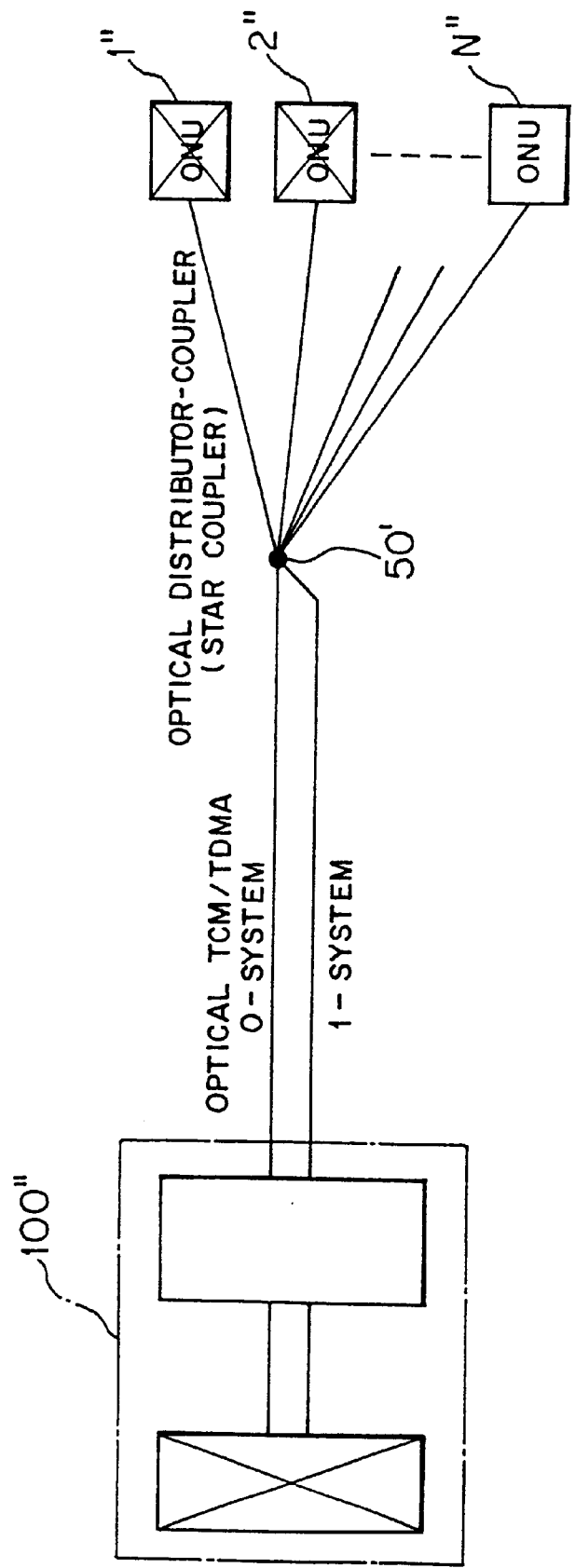
FIG. 16 is a diagrammatic view illustrating an influence of a fault of an optical network unit when the optical network unit transmits an irregular upstream frame.

FIG. 11 illustrates a state wherein the optical network unit (ONU) 2 transmits an irregular upstream frame and an optical signal stopping instruction is transmitted from the station apparatus 100 to the optical network units (ONU) 1 to n.

It is to be noted that the optical signal stopping instruction from the control section 113 of the station apparatus 100 includes an ID of the network unit to be stopped, and the network unit which has an ID coincident with the ID compulsorily stops optical signals of the apparatus itself. Further, the optical signal stopping instruction is transmitted to adjacent optical network units (ONU) through available subscriber-subscriber bypass transmission lines so that stopping of optical signals of the faulty network unit may be performed also when optical signal transmission is faulty.

Each of the optical network units (ONU) 1 to n stops, when it receives an optical signal stopping instruction destined for some of the optical network units (ONU) 1 to n as control information from the station apparatus 100, an optical signal if the optical signal stopping instruction is destined for the self apparatus. In the meantime, any of the optical network units (ONU) 1 to n which receives an optical signal stopping instruction destined for another adjacent optical network unit connected thereto by an available one of the subscriber-subscriber bypass transmission lines produces a subscriber-subscriber signal frame 20 including contents of the optical signal stopping instruction and transmits the subscriber-subscriber signal frame 20 into the available subscriber-subscriber bypass transmission line.

Then, the control section 02 of the adjacent optical network unit which receives the subscriber-subscriber signal frame 20 which includes the optical signal stopping instruction from the station apparatus 100 through the available subscriber-subscriber bypass transmission line stops transmission of optical signals and so forth if contents included in the subscriber-subscriber signal frame 20 are an optical signal stopping instruction.

It is to be noted here that, when the received optical signal stopping instruction is not an optical signal stopping instruction for the self apparatus, the optical network unit may alternatively transmit the signal directly to the available subscriber-subscriber bypass transmission line. In this instance, the control section 02 which detects that the optical signal stopping instruction received through the available subscriber-subscriber bypass transmission line is a stopping signal for the self apparatus establishes an optical signal stopping condition, but if the stopping signal received from the subscriber-subscriber bypass transmission line is not a signal destined for the self apparatus may further transmit the stopping signal to a next subscriber-subscriber bypass transmission line.

Further, when the station apparatus 100 successively transmits a stopping instruction to some of the optical network units (ONU) 1 to n and the control section 113 conveys a result of the transmission to the supervision control apparatus 120, the supervision control apparatus 120 specifies the optical network unit which transmits an irregular upstream frame 30. If the supervision control apparatus 120 specifies the optical network unit which transmits an irregular upstream frame 30, then the supervision control apparatus 120 controls the control section 113 so that the stopping state of the optical network unit may be maintained but control information for cancelling a stopping state may be transmitted to the other optical network units, which operate regularly, in a similar manner as in transmission of a stopping signal.

In this manner, if a particular optical network unit (ONU) 2 of the plurality of optical network units (ONU) 1 to n transmits an irregular signal toward the station apparatus 100 through an optical transmission line and this disables communication with the particular optical network unit (ONU) 2 and another optical network unit (ONU) 1 of the optical network units (ONU) 1 to n different from the particular optical network unit (ONU) 2, then the station apparatus 100 successively outputs a network unit stopping signal to the optical network unit (ONU) 3, n and so forth with which communication remains enabled and also to the particular optical network unit (ONU) 2 through the bypass transmission line 2a to successively stop the network units to specify the optical network unit (ONU) 2 which transmits an irregular signal.

It is to be noted that, also if an optical signal stopping instruction is placed into a different subscriber information transmission sub-frame (downstream) 41 and transmitted from the station apparatus 100 to the optical network units (ONU) 1 to n, optical signals of the optical network unit (ONU) 3, n and so forth are selectively and successively stopped similarly and the supervision control apparatus 120 specifies the optical network unit (ONU) 2 which transmits an irregular upstream frame 30.

In this manner, with the optical subscriber network system of the embodiment of the present invention, a subscriber-subscriber signal frame 20 as a network unit controlling signal which includes unit state data of, for example, the particular optical network unit (ONU) 2 is transmitted from the subscriber-subscriber signal interface 01-1 to the optical network units (ONU) 1 and 3 adjacent and connected to the optical network unit (ONU) 2 through available ones of the subscriber-subscriber bypass transmission lines 1a to (n-1)a for mutual supervision control extending between the optical network units (ONU) 1 to n, and a different subscriber information transmission sub-frame (upstream) 31 is transmitted as network unit mutual supervision control information together with upstream frames 30 from each of the optical network units (ONU) 1 and 3 to the station apparatus 100. The station apparatus 100 can thus specify a faulty point (a location or the like at which the fault has occurred) by supervising contents of such different subscriber information transmission sub-frames 31 sent thereto from the optical network units (ONU) 1 to n.

Further, a different subscriber information transmission sub-frame (downstream) 41 as network unit mutual supervision control information destined for each of the optical network units (ONU) 1 to n is transmitted together with downstream frames 40 from the station apparatus 100. Thus, in each of the optical network units (ONU) 1 to n, contents of the different subscriber information transmission sub-frame 41 sent thereto from the station apparatus 100 are discriminated by the control section 02. Consequently, when an undesirable unit state occurs or the like, the unit can be stopped rapidly.

Since one of the optical network units (ONU) 1 and 3 adjacent and connected to the faulty optical network unit (ONU) 2 through the subscriber-subscriber bypass transmission lines 1a and 2a functions as a repeating unit, the faulty optical network unit (ONU) 2 can secure transmission and reception of communication data to and from the station apparatus 100. Consequently, dual construction of a transmission line between the station apparatus and each optical network unit can be achieved.

Further, if an irregular upstream frame is transmitted, then the control section 113 can specify the optical network unit (ONU) 2, which transmits an irregular upstream frame, by detecting the irregular upstream frame 30 and successively and selectively transmitting an optical signal stopping instruction to the optical network units (ONU) 1 to n.

Consequently, the fault of the unit can be corrected rapidly and interference with communication with the station apparatus 100 can be suppressed, and besides regular timing transmission of upstream data can be secured.

It is to be noted that, since an optical signal stopping instruction is transmitted to the next optical network unit (ONU) 2 through the subscriber-subscriber bypass transmission line 2a, also when a fault is present in the transmission line, the optical network unit (ONU) 2 which transmits an irregular upstream frame can be specified, and consequently, the fault of the unit can be corrected rapidly. Further, interference with communication with the station apparatus 100 can be suppressed and regular timing transmission of upstream data can be secured, and occurrences of congestion in the optical subscriber network (PON) system can be reduced.

2. Others

While, in the description of the optical subscriber network system the embodiment described above, two subscriber-subscriber bypass transmission lines are connected to each optical network unit as seen in FIGS. 7 to 10, the number of subscriber-subscriber bypass transmission lines to be connected to each optical network unit is not limited to two but may be three or more.

2-1. Reduction of Irregular Upstream Frames

By such provision of three or more subscriber-subscriber bypass transmission lines, it is possible to transmit information regarding each of the optical network units (ONU) 1 to n such as a unit state (a reception condition of an optical signal from the station apparatus 100) to the station apparatus 100 through an available optical transmission line, stop operation of the optical network unit (ONU) 2, which is operating irregularly, by control of the station apparatus 100, suppress interference of the fault of the optical network unit (ONU) 2 with communication of the next optical network unit (ONU) 1 with the station apparatus 100 and reduce occurrences of congestion in the optical subscriber network.

2-2. Multi-frame

Further, while a frame which is transmitted to each of the optical network units (ONU) 1 to n from a different one of the optical network units (ONU) 1 to n through an available one of the subscriber-subscriber bypass transmission lines 1a to (n-1)a and to which unit state data of the different optical network unit is added is sent in the form of multi-frames to the station apparatus 100, it may be transmitted to the station apparatus 100 without being divided like a multi-frame.

Where a frame is transmitted in this manner, mutual states of the optical network units can be monitored, and the station apparatus 100 can specify a fault point based on connection information sent thereto. Further, dual construction between the station apparatus and each subscriber can be achieved, and communication between the station apparatus and a faulty network unit can be secured.

2-3. Transmission Destination of Unit State Data

Furthermore, the application of the present invention is not limited to a case wherein supervision information of a self apparatus state is transmitted to neighboring optical network units (ONU), but supervision information of a self unit state may be sent to all or three or more of the optical network units (ONU) 1 to n through subscriber-subscriber bypass transmission lines.

In this instance, information regarding each of the optical network units (ONU) 1 to n such as a unit state (a receiving state or a transmitting state of an optical signal from or to the station apparatus 100) can be transmitted to the station apparatus 100 through an optical transmission line, and operation of a network unit which is operating irregularly can be stopped by control of the station apparatus 100. Further, interference of a fault of a certain optical network unit with communication of another optical network unit with the station apparatus can be suppressed, and occurrences of congestion in the optical subscriber network can be reduced. Further, since an optical network unit which is operating regularly and is different from a faulty optical network unit interrupts communication from the faulty optical network unit and transmits to the station apparatus 100 using a subscriber-subscriber bypass transmission line, dual construction of a transmission line between the station apparatus and each subscriber can be achieved, and also communication between the station apparatus and the faulty network unit can be secured.

2-4. Different Subscriber Information Transmission Subframe

Further, when to secure communication between the station apparatus 100 and the faulty optical network unit (ONU) 2 (M; refer to FIG. 6), alternatively the faulty optical network unit (ONU) 2 (M) may place communication data into a subscriber-subscriber signal frame 20 and transmit it to the non-faulty optical network unit (ONU) 1 (L; refer to FIG. 6), which operates regularly, through a subscriber-subscriber bypass transmission line whereas the non-faulty optical network unit (ONU) 1 (L) which operates regularly may place the communication data received from the optical network unit (ONU) 2 (M) into a different subscriber information transmission sub-frame (upstream) 31 and transmit it to the station apparatus 100. Further, also when the faulty optical network unit (ONU) 2 (M) is to receive communication data from the station apparatus 100, the communication data destined for the faulty optical network unit (ONU) 2 (M) may be placed into a downstream frame 40 and repeated by the optical network unit (ONU) 1 (L) which operates regularly so that it may be placed into a subscriber-subscriber signal frame 20 and transmitted to the optical network unit (ONU) 2 (M).

2-5. Subscriber-subscriber Frame

On the other hand, a subscriber-subscriber signal frame 20 as a network unit mutual supervision controlling signal may not always be communicated between optical network units, but it may alternatively be transmitted between the faulty optical network unit (ONU) 2 (M) and the non-faulty optical network unit (ONU) 1 (L) when the control section 02F detects a fault based on a result of supervision or the like. Similarly, network unit mutual supervision control information may be transmitted from the optical network unit (ONU) 1 (L) to the station apparatus 100 or vice versa.

2-6. Faulty Network Unit

While detailed description is given above of a case wherein the optical network unit (ONU) 2 has some fault, also when a plurality of (two or more) network units (UNO) including or except the optical network unit (ONU) 2 faulty, it is possible to supervise a fault and perform communications with the two or more faulty optical network units and so forth similarly.

2-7

Having now fully described the invention, it will be apparent to one of ordinary skill in the art that many changes and modifications can be made thereto without departing from the spirit and scope of the invention as set forth herein.

What is claimed is:

1. An optical subscriber network system of a passive optical network construction wherein a plurality of network units are accommodated in a station apparatus through an optical transmission line using a passive optical element, comprising:

bypass transmission lines for mutual supervision control between said network units;

each of said network units including transmission/ reception means for transmitting and receiving a network unit mutual supervision control signal to and from another one of said network units through an available one of said bypass transmission lines, and means for transmitting received network unit mutual supervision control information to said station apparatus through said optical transmission line;

said station apparatus including means for supervising a fault from the network unit mutual supervision control information.

2. An optical subscriber network system of a passive optical network construction wherein a plurality of network units are accommodated in a station apparatus through an optical transmission line using a passive optical element, comprising:

bypass transmission lines for mutual supervision control between said network units;

a faulty network unit which is any one of said network units which is not capable of communicating with said station apparatus through said optical transmission line including transmission means for transmitting a network unit mutual supervision control signal to one of non-faulty ones of said network units other than the faulty network unit through an available one of said bypass transmission lines;

the non-faulty network unit including means for transmitting the network unit mutual supervision control information received from the faulty network unit to said station apparatus through said optical transmission line connected to the non-faulty network unit;

said station apparatus including means for supervising a fault from the network unit mutual supervision control information.

3. An optical subscriber network system as claimed in claim 1, wherein each of said bypass transmission lines connects adjacent ones of said network units.

4. An optical subscriber network system as claimed in claim 2, wherein each of said bypass transmission lines connects adjacent ones of said network units.

5. An optical subscriber network system as claimed in claim 1, wherein a faulty network unit which is any one of said network units which is not capable of communicating with said station apparatus through said optical transmission line includes transmission means for transmitting a network unit mutual supervision control signal to one of non-faulty ones of said network units other than the faulty network unit through an available one of said bypass transmission lines, and the non-faulty network unit includes means for transmitting the network unit mutual supervision control information received from the faulty network unit to said station apparatus through said optical transmission line connected to the non-faulty network unit.

6. An optical subscriber network system as claimed in claim 2, wherein the non-faulty subscriber unit which is any one of said network units which is not capable of communicating with said station apparatus through said optical transmission line includes means for transmitting network unit mutual supervision control information received from said station apparatus to the faulty network unit through the available bypass transmission line, and the faulty subscriber unit includes means for receiving the network unit mutual supervision control information from the non-faulty network unit.

7. An optical subscriber network system as claimed in claim 5, wherein the non-faulty subscriber unit includes means for transmitting network unit mutual supervision control information received from said station apparatus to the faulty network unit through the available bypass transmission line, and the faulty subscriber unit includes means for receiving the network unit mutual supervision control information from the non-faulty network unit.

8. An optical subscriber network system as claimed in claim 1, wherein a faulty network unit which is any one of said network units which is not capable of communicating with said station apparatus through said optical transmission line includes transmission means for transmitting communication data to the non-faulty network unit through the available bypass transmission line, and the non-faulty network unit includes means for transmitting the communication data received from the faulty network unit to said station apparatus through said optical transmission line connected to the non-faulty network unit.

9. An optical subscriber network system as claimed in claim 2, wherein a faulty network unit which is any one of said network units which is not capable of communicating with said station apparatus through said optical transmission line includes transmission means for transmitting communication data to the non-faulty network unit through the available bypass transmission line, and the non-faulty network unit includes means for transmitting the communication data received from the faulty network unit to said station apparatus through said optical transmission line connected to the non-faulty network unit.

10. An optical subscriber network system as claimed in claim 1, wherein a non-faulty network unit other than a faulty network unit which is any one of said network units which is not capable of communicating with said station apparatus through said optical transmission line includes means for transmitting communication data received from said station apparatus to the faulty network unit through the available bypass transmission line, and the faulty network unit includes means for receiving the communication data from the non-faulty network unit.

11. An optical subscriber network system as claimed in claim 2, wherein the non-faulty network unit other than the faulty network unit which is any one of said network units which is not capable of communicating with said station apparatus through said optical transmission line includes means for transmitting communication data received from said station apparatus to the faulty network unit through the available bypass transmission line, and the faulty network unit includes means for receiving the communication data from the non-faulty network unit.

12. An optical subscriber network system as claimed in claim 8, wherein the non-faulty network unit includes means for transmitting communication data received from said station apparatus to the faulty network unit through the available bypass transmission line, and the faulty network unit includes means for receiving the communication data from the non-faulty network unit.

13. An optical subscriber network system as claimed in claim 9, wherein the non-faulty network unit includes means for transmitting communication data received from said station apparatus to the faulty network unit through the available bypass transmission line, and the faulty network unit includes means for receiving the communication data from the non-faulty network unit.

14. A fault supervising method for an optical subscriber network system of a passive optical network construction wherein a plurality of network units are accommodated in a station apparatus through an optical transmission line using a passive optical element, comprising the steps of:

providing bypass transmission lines for mutual supervision control between said network units;

communicating a network unit mutual supervision control signal between said network units through said bypass transmission lines;

transmitting the network unit mutual supervision control information received by each of said network units to said station apparatus through said optical transmission line; and supervising a fault based on the network unit mutual supervision control information by said station apparatus.

15. A fault supervising method for an optical subscriber network system as claimed in claim 14, wherein network unit mutual supervision control information to be transmitted from each of said network units to said station apparatus through said optical transmission line is inserted into part of a communication data transmission frame so as to be transmitted as multi-frame information to said station apparatus.

16. A fault supervising method for an optical subscriber network system as claimed in claim 14, wherein, when an optical transmission line between a particular one of said network units and said station apparatus has a fault, the network unit mutual supervision control signal from the particular network unit is received by one of non-faulty ones of said network units which is adjacent the particular network unit through an available one of said bypass transmission lines, and the received network unit mutual supervision control information is transmitted to said station apparatus through said optical transmission line so that the fault of the particular network unit is supervised by said station apparatus.

17. A fault supervising method for an optical subscriber network system as claimed in claim 14, wherein, when a particular one of said network units has a fault, the network unit mutual supervision control signal from the particular network unit is received by one of non-faulty ones of said network units which is adjacent the particular network unit through an available one of said bypass transmission lines, and the received network unit mutual supervision control information is transmitted to said station apparatus through said optical transmission line so that the fault of the particular network unit is supervised by said station apparatus.

18. A fault supervising method for an optical subscriber network system as claimed in claim 14, wherein, if a particular one of said network units transmits an irregular signal toward said station apparatus through said optical transmission line and communication with the particular network unit and a different one of said network units from the particular network unit is disabled by the irregular signal, said station apparatus successively transmits a network unit stopping signal to the particular network unit and the different network unit via those of said network units with which communication remains enabled and available ones of said bypass transmission lines to successively stop the particular network unit and the different network unit to specify the particular network unit which transmits the irregular signal.

19. A fault supervising method for an optical subscriber network system as claimed in claim 14, wherein, when an optical transmission line between a particular one of said network units and said station apparatus has a fault, communication data from the particular network unit is transmitted to said station apparatus through an available one of said bypass transmission lines, one of non-faulty ones of said network units other than the particular network unit and said optical transmission line between the non-faulty network unit and said station apparatus.

20. A fault supervising method for an optical subscriber network system as claimed in claim 14, wherein, when an optical transmission line between a particular one of said network units and said station apparatus has a fault, communication data from said station apparatus is transmitted to the particular network unit through one of non-faulty ones of said network units other than the particular network unit and an available one of said bypass transmission lines.

21. A fault supervising method for an optical subscriber network system as claimed in claim 19, wherein, when an optical transmission line between a particular one of said network units and said station apparatus has a fault, communication data from said station apparatus is transmitted to the particular network unit through one of non-faulty ones of said network units other than the particular network unit and an available one of said bypass transmission lines.

22. A fault supervising method for an optical subscriber network system as claimed in claim 14, wherein, when a particular one of said network units has a fault, communication data from the particular network unit is transmitted to said station apparatus through an available one of said bypass transmission lines, one of non-faulty ones of said network units other than the particular network unit and said optical transmission line between the non-faulty network unit and said station apparatus.

23. A fault supervising method for an optical subscriber network system as claimed in claim 14, wherein, when a particular one of said network units has a fault, communication data from said station apparatus is transmitted to the particular network unit through one of non-faulty ones of said network units other than the particular network unit and an available one of said bypass transmission lines.

* * * * *